United States Patent [19]
Lariviere

[11] Patent Number: 5,839,691
[45] Date of Patent: Nov. 24, 1998

[54] VERTICAL TAKEOFF AND LANDING AIRCRAFT

[76] Inventor: Jean Soulez Lariviere, 74 rue de Rome, Paris, France, 75008

[21] Appl. No.: 651,582

[22] Filed: May 22, 1996

[51] Int. Cl.$^6$ .................................................. B64C 29/00
[52] U.S. Cl. .......................... 244/7 R; 244/12.4; 244/56; 244/66; 244/17.23
[58] Field of Search ................................ 244/7 R, 6, 7 A, 244/7 C, 12.1, 12.3, 12.4, 56, 66, 17.23

[56] References Cited

U.S. PATENT DOCUMENTS

| | | | |
|---|---|---|---|
| 3,037,721 | 6/1962 | Stefanutti | 244/66 |
| 3,106,369 | 10/1963 | Borst | 244/66 |
| 3,141,633 | 7/1964 | MacKay | 244/7 R |
| 3,181,810 | 5/1965 | Olson | 244/7 R |
| 3,284,027 | 11/1966 | Mesniere . | |
| 3,528,630 | 9/1970 | Ferris et al. | 244/66 |
| 4,116,405 | 9/1978 | Bacchi et al. | 244/66 |
| 4,142,697 | 3/1979 | Fradenburg | 244/7 R |
| 5,046,684 | 9/1991 | Wolkovitch | 244/7 R |
| 5,419,514 | 5/1995 | Ducan | 244/56 |

*Primary Examiner*—Galen L. Barefoot
*Attorney, Agent, or Firm*—H. Jay Spiegel

[57] ABSTRACT

A vertical takeoff and landing aircraft has a fuselage with a wing located above the fuselage at the rearward end and with a horizontal stabilizer located at the forward end. The propellers are mounted on booms separate from the wings and located just behind the center of gravity of the aircraft. The propellers are pivotable between horizontal and vertical axes and brakes are provided to allow locking of propeller position. When the brakes are released, the propellers automatically pivot between vertical and horizontal orientations and vice-versa based upon control of the aircraft by the pilot.

31 Claims, 20 Drawing Sheets

FIG. 1A
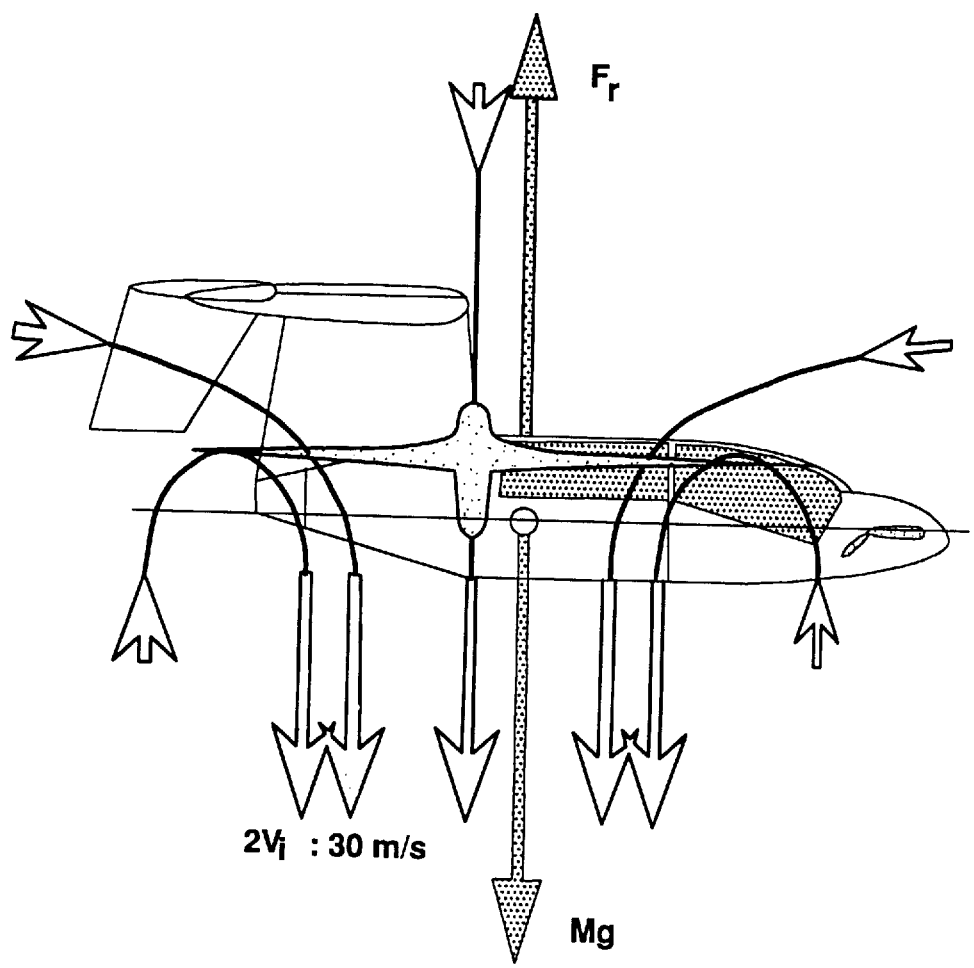
$F_r$
$2V_i$ : 30 m/s
Mg
FIG. 1B
FIG. 1C
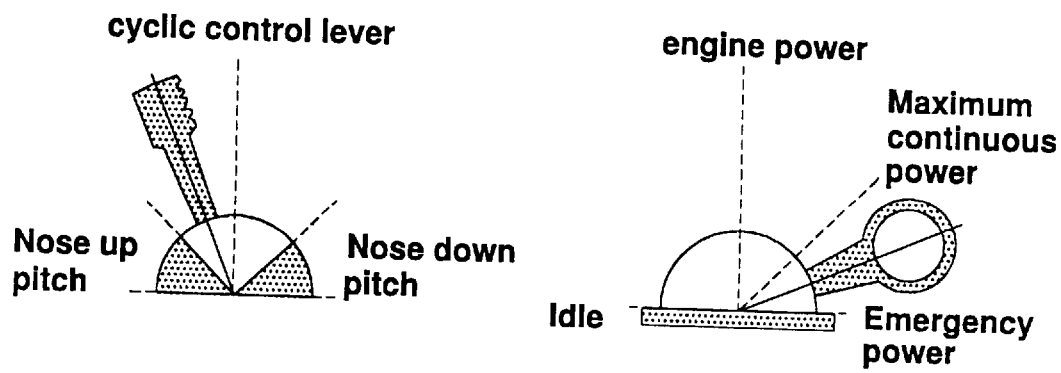
cyclic control lever — Nose up pitch / Nose down pitch
engine power — Idle / Maximum continuous power / Emergency power

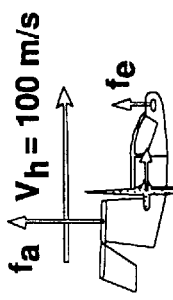
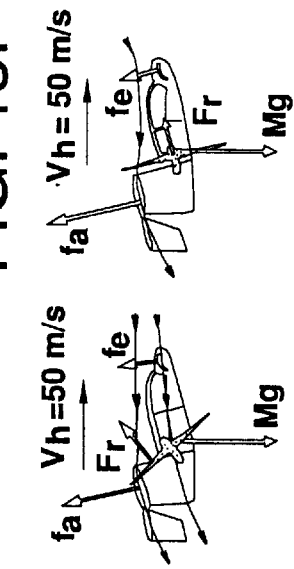
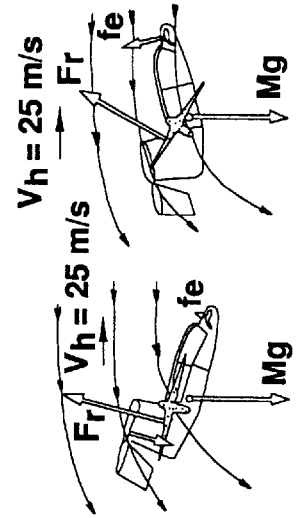
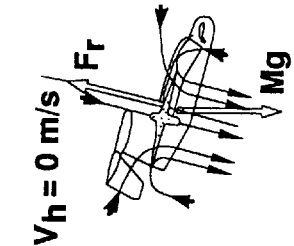
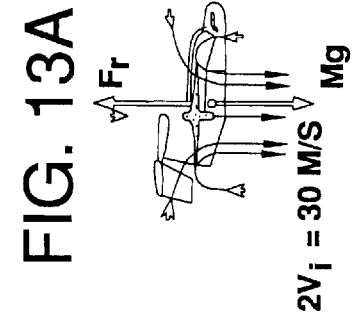

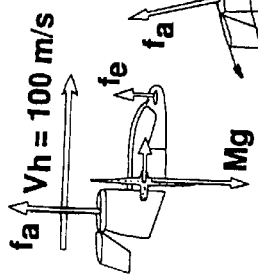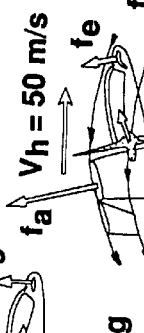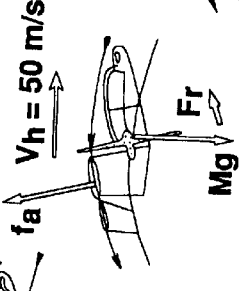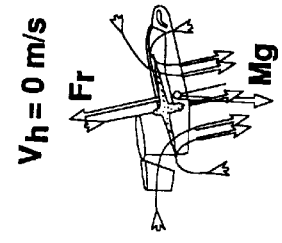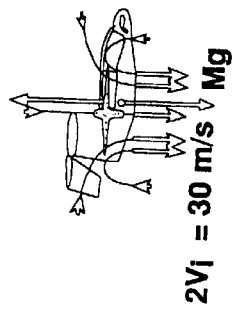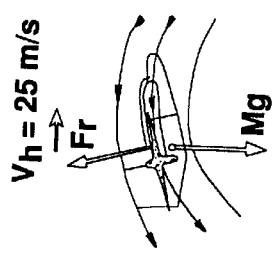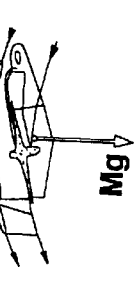

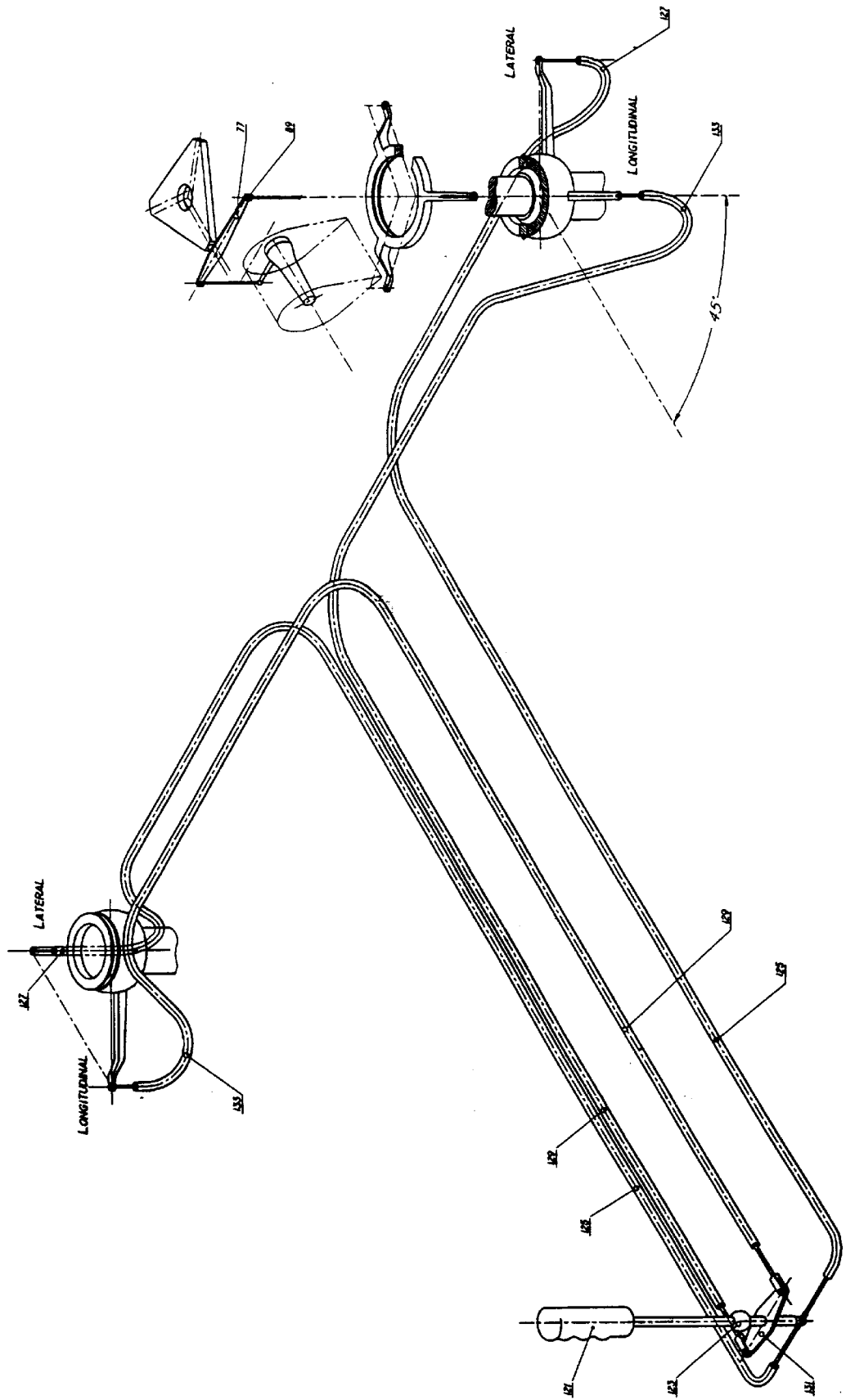

VERTICAL TAKEOFF AND LANDING AIRCRAFT

BACKGROUND OF THE INVENTION

Airplanes or helicopters having propellers or rotors located symmetrically on both sides of the aircraft and capable of being rotated 90° upward from a horizontal position of axis are known as tilt-rotor/tilt-propeller aircraft. The propellers' or rotor' vertical axis positioning directs airflow downward and thrust upward and allows the aircraft to move in a purely vertical plane or to simply hover. Positioning the propellers' or rotors' axis horizontally directs the thrust forward and allows for conventional level flight. In this latter configuration, lift is provided by the flow of air around lifting surfaces such as wings or horizontal stabilizers. In between the completely vertical and completely horizontal axis configurations, any tilt angle can be obtained, resulting in various corresponding oblique flight paths and acceleration-deceleration phases known as forward and backward transitions.

Such aircraft combine a helicopter's slow flight capability with its ability to take-off or land vertically and a conventional airplane's capacity for high-speed level flight. An airplane can attain about twice the speed of a typical helicopter, over 300 miles per hour as opposed to less than 170 miles per hour for a helicopter. However, a typical prior art tilt-rotor aircraft's inherent mechanical and structural complexity increases its empty weight over that of a similarly sized airplane while also increasing production cost. Furthermore, such an aircraft's development in terms of aerodynamic qualities, stability, flight dynamics and control is made more difficult due to the effects, at slow speeds, of the mass of air displaced by the propeller around the aircraft's various lifting surfaces. This mass of air is known as propeller wash, or simply prop wash.

The following three design considerations are particularly noteworthy:

1) The effects of prop wash on the aircraft's wings:

Propellers or rotors are usually attached to engines mounted on either end of a wing which serves as a structural support. However, this setup causes a problem during the transition from vertical to horizontal flight. The changes in the angle of the direction of the prop wash do not vary directly with the changes in the angle at which the propellers are tilted. As long as the horizontal velocity and resulting lift from the conventional lifting surfaces have relatively low values, most of the lift is provided by the propellers or rotors themselves. Because of this phenomenon, the propellers will tilt forward very slowly as the aircraft begins to transition to level flight, then faster as the wings begin to provide more of the lift. On the contrary, the tilt angle of the wash caused by the propellers varies rapidly at first but slows down as the aircraft transitions from vertical to horizontal flight.

Up to this time, in the prior art, the following two configurations have been used to try to avoid the problem caused by the different rates at which the propellers themselves and their resulting wash tilt with respect to the wing:

a) The horizontal wing is permanently attached to the aircraft and the propellers themselves rotate upwards. However, this configuration has a major disadvantage. When the propellers are in the vertical position, the prop wash acts directly downward onto the wing and creates a downward force which can be compared to negative lift. This loss in lift effectively reduces the aircraft's useful load.

b) The horizontal wing is permanently attached to the propellers and pivots as the propellers do. This eliminates the negative lift problem but causes another one. When the wing is pivoted up and the aircraft still has horizontal velocity, the entire surface of the wing is placed directly in the path of the airflow. The mass of air suddenly hitting this huge flat surface causes stability and control problems.

2) The tilting mechanism:

In a tilt rotor helicopter, pitching motion is achieved by varying the rotors' cyclic pitch. In a tilt-propeller airplane, pitching motion is achieved by varying the thrust of a vertical axis auxiliary tail rotor, when such is employed. Regardless, tilting motion of the propellers or rotors in a prior art tilt-rotor aircraft is achieved using a wing-mounted or fuselage-mounted servo-actuator. Needless to say, this actuator must be of the utmost reliability. Should this mechanism fail, the aircraft on which it is being employed would have great difficulty landing due to the fact that the propellers or rotors would remain in the level flight configuration and because of their large diameter, strike the ground as the aircraft tried to land.

3) Combining roll and yaw controls:

Anti-symmetric motion, namely roll and yaw, is generally controlled by variations of propeller pitch and tilt angle. For aircraft on which the entire wing pivots with the propellers, rolling and yawing motion are controlled using flaps placed on the wing upon which the propeller wash acts. However, the effectiveness of these control techniques varies with the tilt angle of the propellers or wing, whether they are completely vertical, completely horizontal, or somewhere in-between. During vertical flight, changing the propeller pitch affects the aircraft's roll rate, but during level flight, changes in pitch affect the aircraft's yaw rate. Similarly, tilting the propellers during vertical flight or tilting of wing flaps, if present, causes changes in yaw but causes changes in roll in level flight. Combining these control techniques so that a pilot can easily comprehend and manipulate them is quite complicated, and therefore computer-controlled digital flight controls are necessary.

These three design problems have been dealt with in prior art tilt-rotor aircraft using extremely complicated and intricate systems. The high cost of this complexity limits the use of these aircraft to very specific tasks. Furthermore, the high cost of this level of complexity makes it impossible for tilt-rotor technology to be applied to small general aviation-type aircraft which constitute the majority of the aircraft market.

The present invention incorporates new solutions to these three design problems.

The following prior art is known to Applicant:

U.S. Pat. No. 1,981,700 to Hoffman
U.S. Pat. No. 3,289,980 to Hill
U.S. Pat. No. 3,358,946 to Shye
U.S. Pat. No. 3,409,248 to Bryan
U.S. Pat. No. 3,488,018 to Johnson
U.S. Pat. No. 4,541,593 to Cabrol
U.S. Pat. No. 4,641,800 to Rutan
U.S. Pat. No. 4,881,701 to Bullard
U.S. Pat. No. 5,320,306 to Gennaro
U.S. Pat. No. 5,419,514 to Ducan.

The present invention patentably distinguishes from these references, taken alone or in combination, in that, the present invention contemplates a particular configuration of the wing, horizontal stabilizer, mounts for the propellers, control techniques and mode of actuation thereof nowhere taught or suggested in the prior art.

SUMMARY OF THE INVENTION

The present invention relates to a vertical takeoff and landing aircraft. The present invention includes the following interrelated objects, aspects and features:

1) The first important design characteristic deals with the placement of the propeller, wings, and horizontal stabilizer of the aircraft. These three items are divided into three distinct assemblies.

a) Each of the propellers is attached to a short, fixed boom. The boom is positioned halfway up the fuselage and slightly aft of the aircraft's center of gravity. The boom's purpose is entirely structural. Consequently, its cross-section is the smallest possible to ensure that it can perform its structural function, which is to serve as a mount for the propellers.

b) The aircraft's wing is fixed and cannot be tilted. It is of a "parasol-type" configuration and is attached to the fuselage by means of single or dual oblique pylons. On each wingtip is an inverted fin. The wing is located at the rear of the aircraft, behind the axis of the propellers in order to be completely unaffected by prop wash.

c) The horizontal stabilizer is located at the front of the airplane, in the form of canards. This positioning compensates for the extreme rearward location of the wing and helps bring neutral point to a position near that of the small propeller-bearing booms. Each canard contains a single flap which the pilot can use to vary the aircraft's aerodynamic moment.

The purpose for this setup is to eliminate the prop wash related design problems described in the BACKGROUND OF THE INVENTION. The wing remains fixed and is unaffected by the prop wash. This configuration eliminates the negative lift problem encountered during vertical flight, as well as the occurrence of high angles of attack during transitions between flight modes. The only disadvantage found in this configuration is the added drag produced by the booms. However, since the wing itself is free of flaps and other protrusions, it generates virtually no excess drag, and therefore makes up for the minimal drag created by the booms.

2) A second important design characteristic has to do with the propellers themselves. The propeller blades, which are attached to a central hub, can have their general (collective) pitch varied as is the case with most propeller driven aircraft. This means that the three (or more) blades can have their pitches varied altogether to the same degree resulting in a variation of the propeller's thrust. Furthermore, each blade can also have its cyclic pitch varied, on both the longitudinal and lateral axes of the propeller, as is the case with most helicopters. This cyclic pitch variation means that each of the three (or more) blades can have their pitches varied according to a sine or cosine function of the blade azimut. A sine function, with 0° reference to the rearward direction, when propeller axis is vertical, increases the pitch on the outer half and decreases the pitch on the inner half of the propeller disk, and will be called, in this application, a lateral cyclic pitch variation. A cosine function, with the same reference increases the pitch on the rear half and decreases it on the front half of the propeller disc, and will be called a longitudinal cyclic pitch variation. Unlike a regular helicopter, however, the blades are not free to flap up and down. They are not hinged; they are rigidly and rotatably attached to the hub. As a result of this rigidity, the cyclic pitch variation does not produce a tilting of the propeller and of its thrust, relative to the hub, as in hinged helicopter rotors, but, rather, produces an aerodynamic moment applied to this hub by the blades (or an equivalent radial displacement of the resulting thrust).

3) The third important design characteristic deals with the tilting of the propellers. The tilting of the propellers is not controlled by any type of servo-actuator. The propellers are free to tilt on their own, based on an applied moment resulting from changes in the cyclic pitch of the propeller blades. This phenomenon will be further explained hereinbelow.

In the propellers, freedom to tilt upward and downward without the intervention of any mechanical actuator device is however limited by an assembly which performs the following four tasks:

a) Linkage: a linkage rod connected to each propeller turns as the propellers tilt and ensures that the tilting angle of the propellers is the same; it transmits the tilting motion to a central assembly which ensures that the degree of tilting of the propellers stays within the 90° circular path. Moreover, each linkage rod has sufficient elasticity to allow the propellers a 2° or 3° difference in tilt angle from each other or from the central assembly.

b) Control of tilting speed: the tilting speed of the propellers is restrained by a hydraulic damping system which is part of the central assembly.

c) To ensure that the propellers stay within the 0° to 90° tilting range:
      i) The central assembly has a blocking mechanism to ensure that the propellers do not tilt more than 90°, which is to say that they do not tilt backward once their axis is oriented vertically. The blocking mechanism consists simply of a stop which the central assembly comes to rest against once it is in the vertical position.
      ii) When the axis of the propellers is in the horizontal position, at 0°, a pilot-controlled locking mechanism is used to lock each propeller nacelle onto its boom, thus preventing the propellers from tilting.

d) Braking the tilting of the rotors: the central assembly includes a hydraulic damping system that contains an extra device that allows the pilot to suppress the tilting freedom of the propellers and to hold, for a period of time, the propellers' tilt angle at any intermediary angle between the 0° and 90° positions. As an option, the braking system can be eliminated if the pilot does not intend to fly the aircraft at slow speeds (65–100 feet per second) for extended periods of time, which would require the propellers to be maintained at a tilt angle other than 0° or 90°.

Accordingly, it is a first object of the present invention to provide a vertical takeoff and landing (VTOL) aircraft.

It is a further object of the present invention to provide such a device wherein the wings of the aircraft are mounted at the rear thereof and the horizontal stabilizer is mounted at the front thereof.

It is a still further object of the present invention to provide such an aircraft wherein the propellers thereof are mounted on supports separate from the wings thereof.

It is a still further object of the present invention to provide such an aircraft wherein control means is provided to move the propellers between horizontal and vertical orientations without the use of any type of servo-actuator.

It is a still further object of the present invention to provide such an aircraft wherein anti-symmetric roll and yaw control means do not interchange between hover and level flight.

These and other objects, aspects and features of the present invention will be better understood from the following detailed description of the preferred embodiment when read in conjunction with the appended drawing figures.

BRIEF DESCRIPTION OF THE DRAWINGS

FIGS. 1A–12C sequentially depict the various modes of operation of the present invention from sitting on a Tarmac, to vertical lift-off, to transition to horizontal flight, to horizontal flight, to transition from horizontal flight to vertical descent, to vertical descent, to landing, including, in each numbered figure sub-figures A, B and C, with the sub-figure labeled A, in each instance, depicting a schematic representation of the position and orientation of the aircraft, with the sub-figure labeled B, in each instance, depicting a schematic representation of the position of the cyclic control lever of the aircraft, and with the sub-figure labeled C, in each instance, depicting a schematic representation of the position of the throttle control lever.

FIGS. 13A–13G combine together FIGS. 1A, 2A, 3A, 4A, 5A, 6A and 7A, respectively, in a single sequence.

FIGS. 14A–14G combine together FIGS. 7A, 8A, 9A, 10A, 11A, 12A and 1A, respectively, in a single sequence.

SPECIFIC DESCRIPTION OF THE PREFERRED EMBODIMENT

Figure 2A:
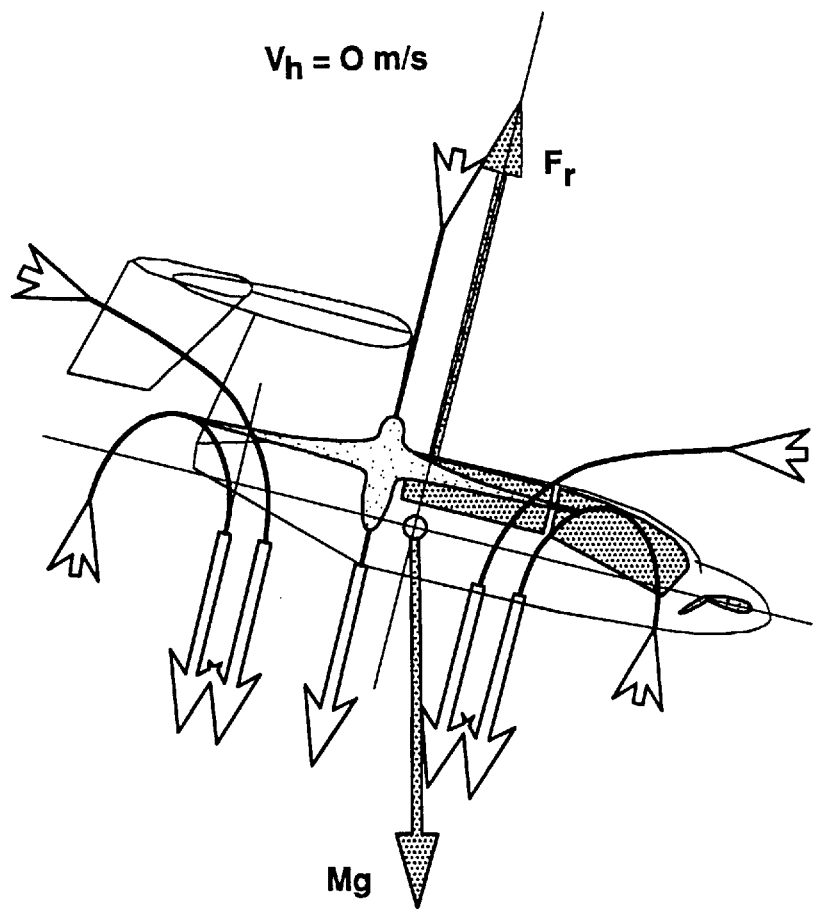
Figure 2B:
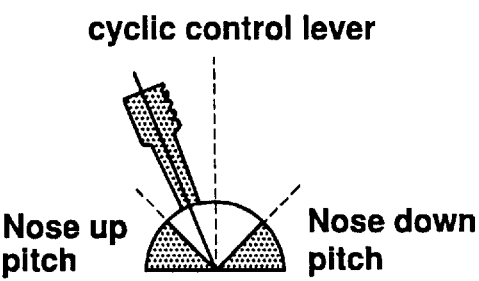
Figure 2C:
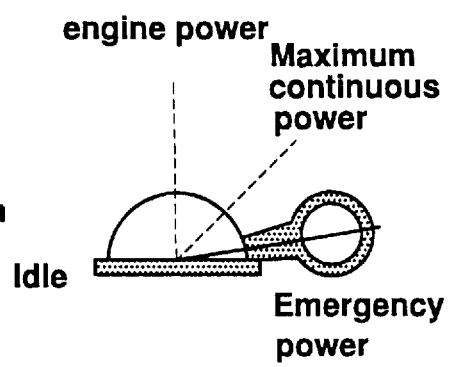
Figure 3A:
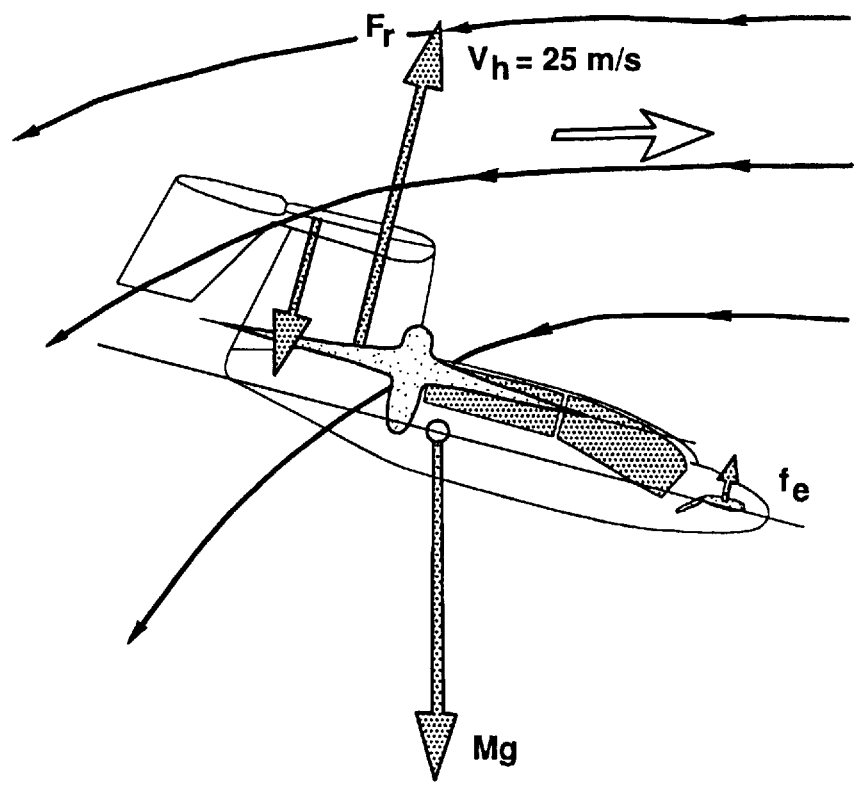
Figure 3B:
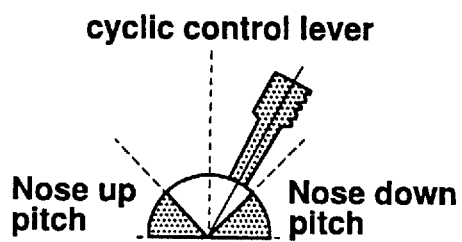
Figure 3C:
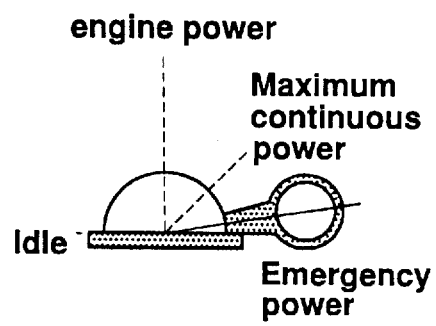
Figure 4A:
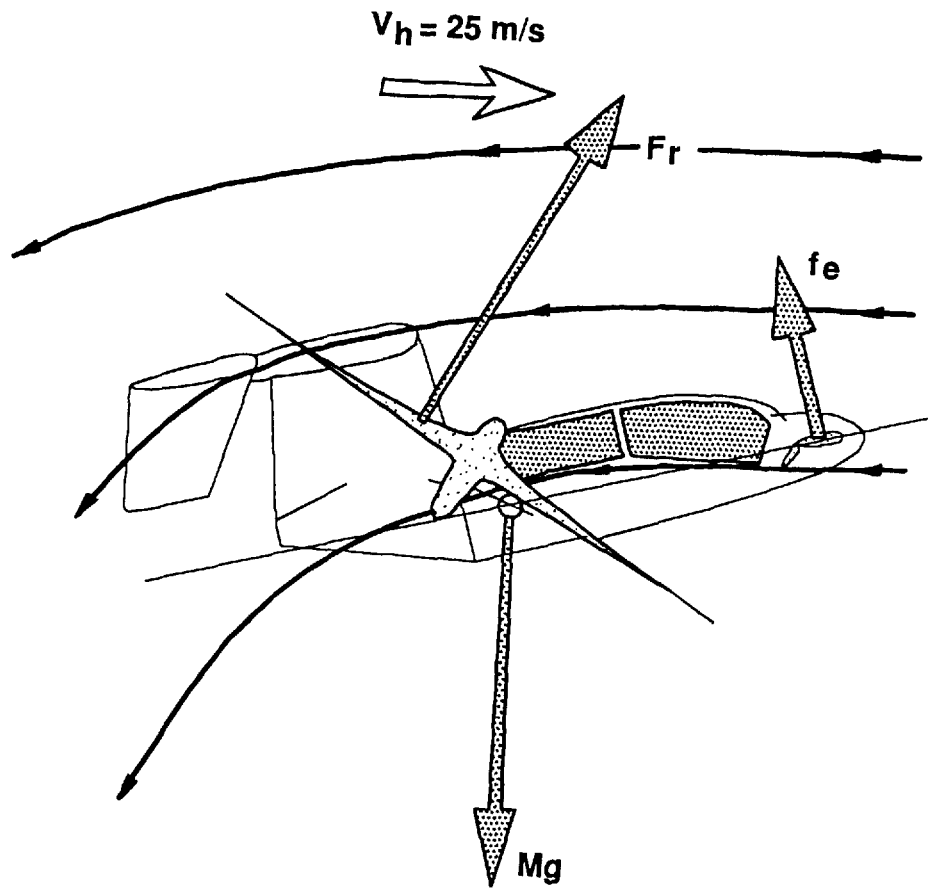
Figure 4B:
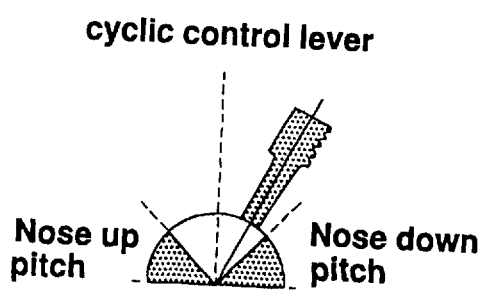
Figure 4C:
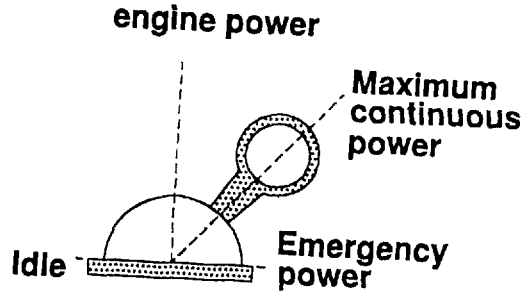
Figure 5A:
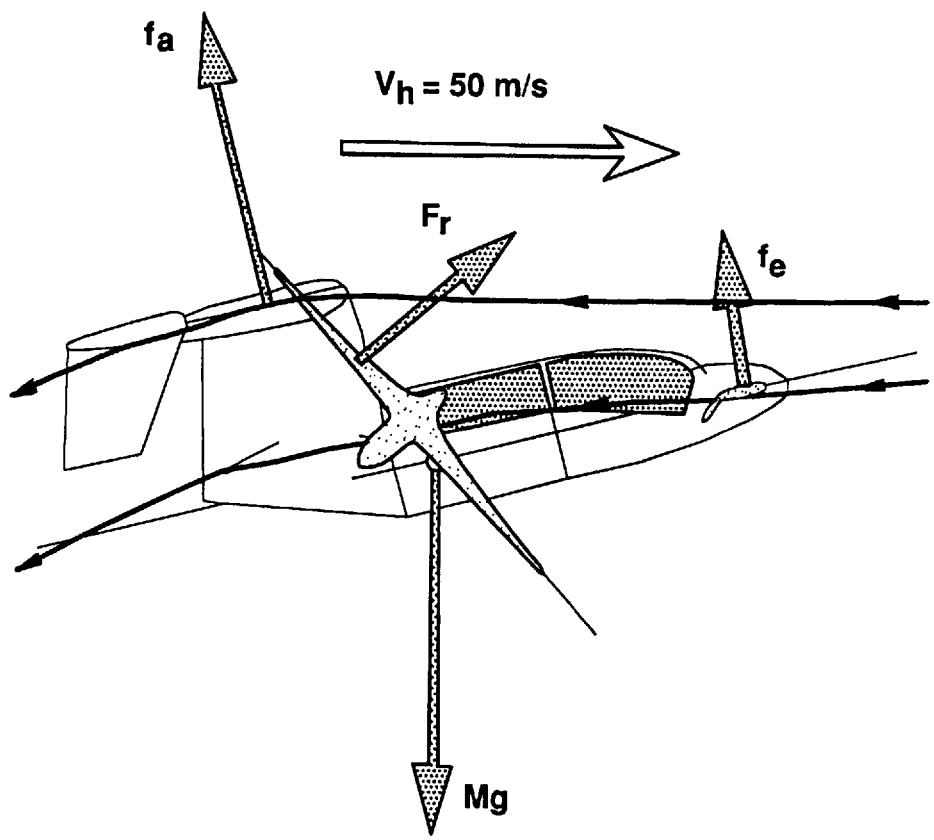
Figure 5B:
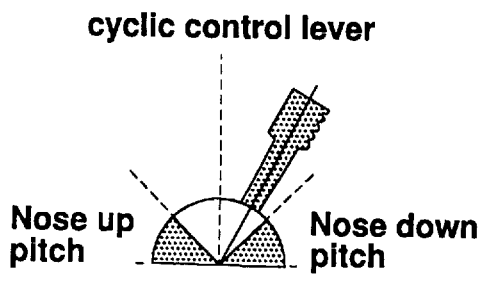
Figure 5C:
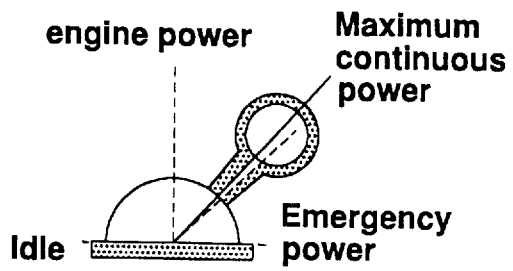
Figure 6A:
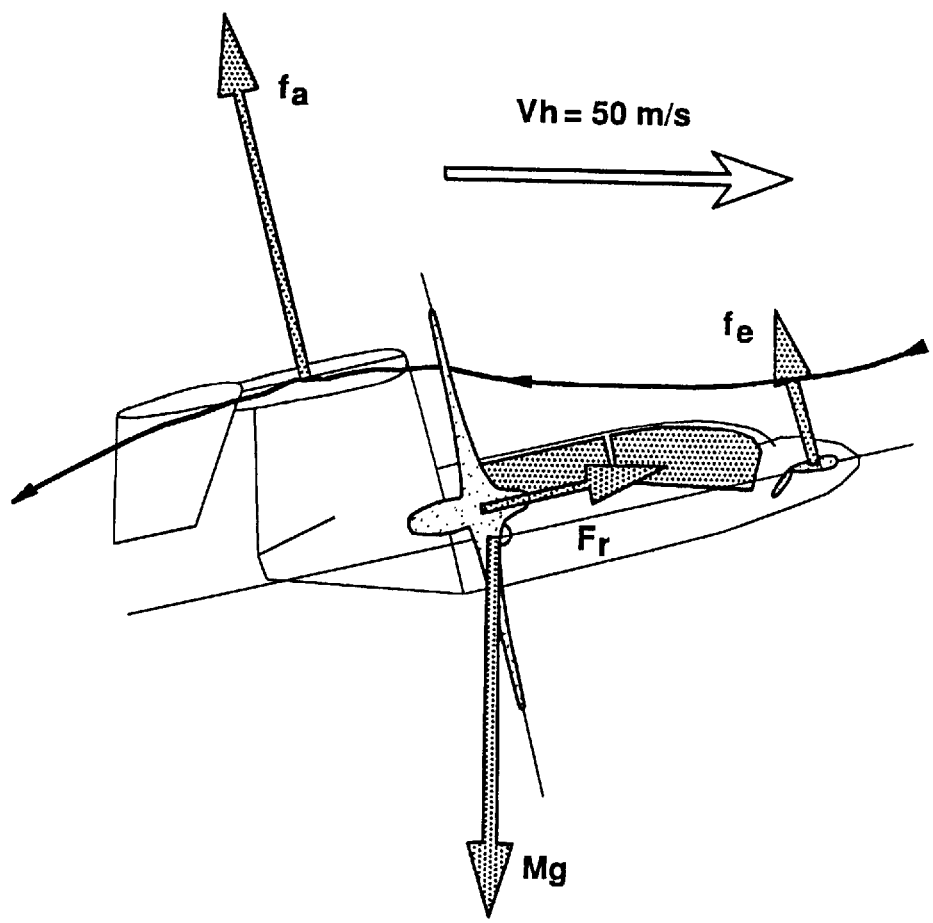
Figure 6B:
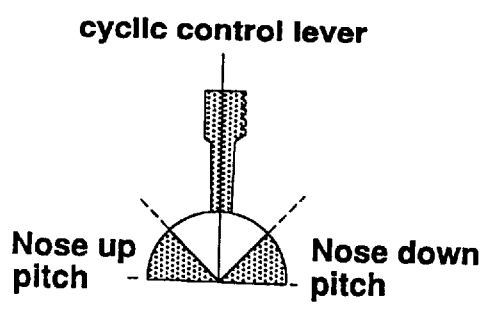
Figure 6C:
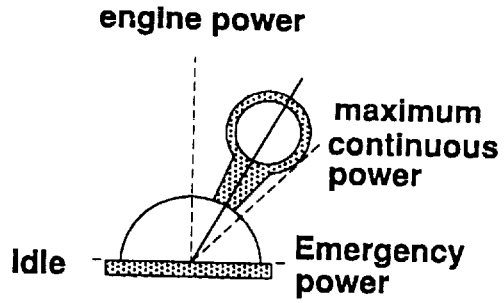
Figure 7A:
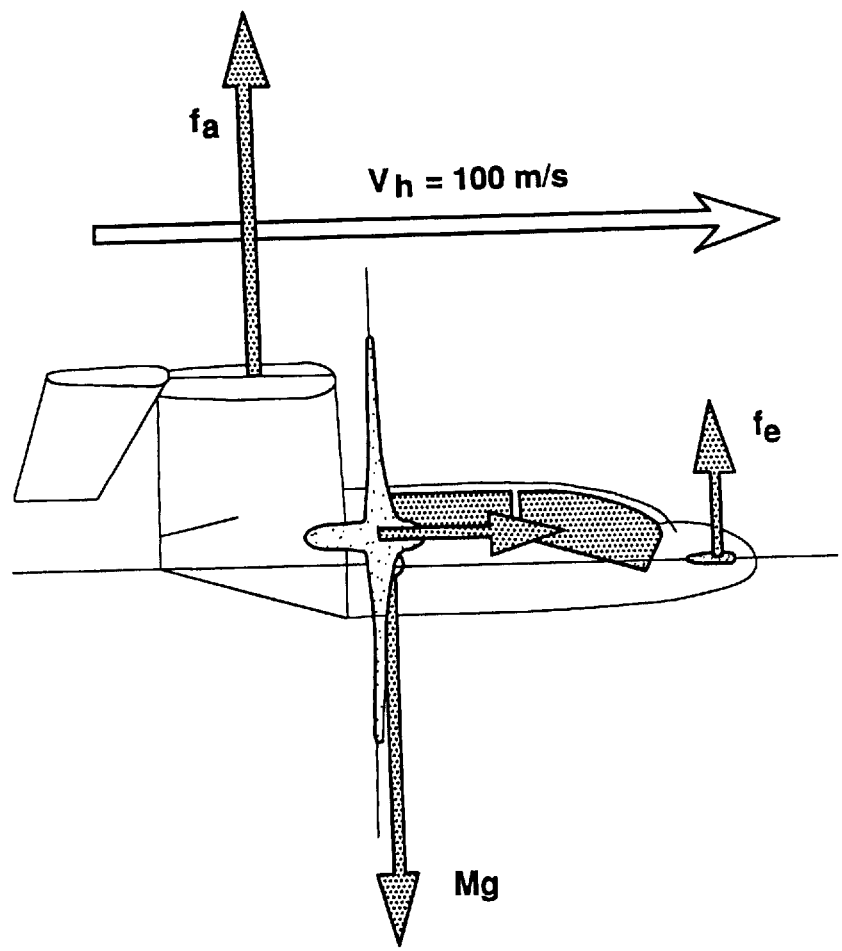
Figure 7B:
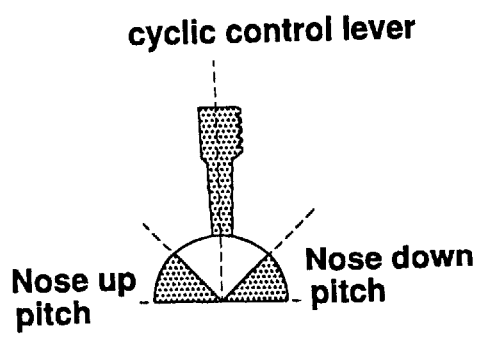
Figure 7C:
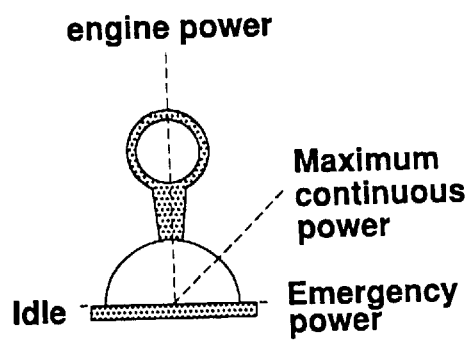
Figure 8A:
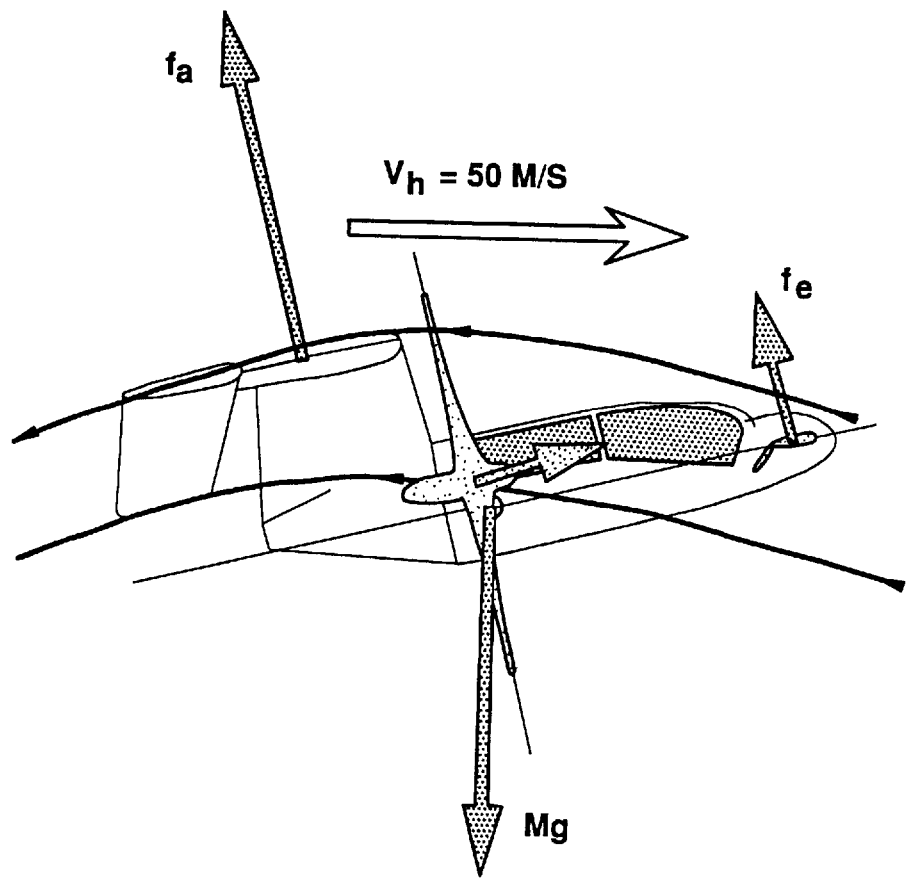
Figure 8B:
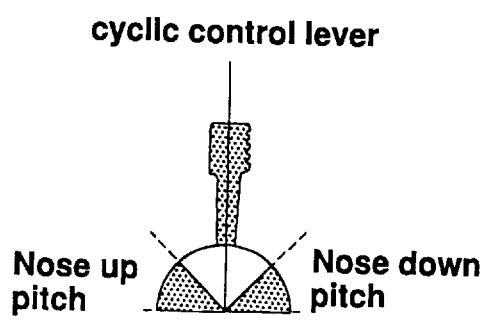
Figure 8C:
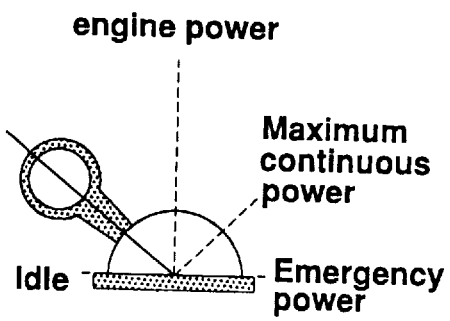
Figure 9A:
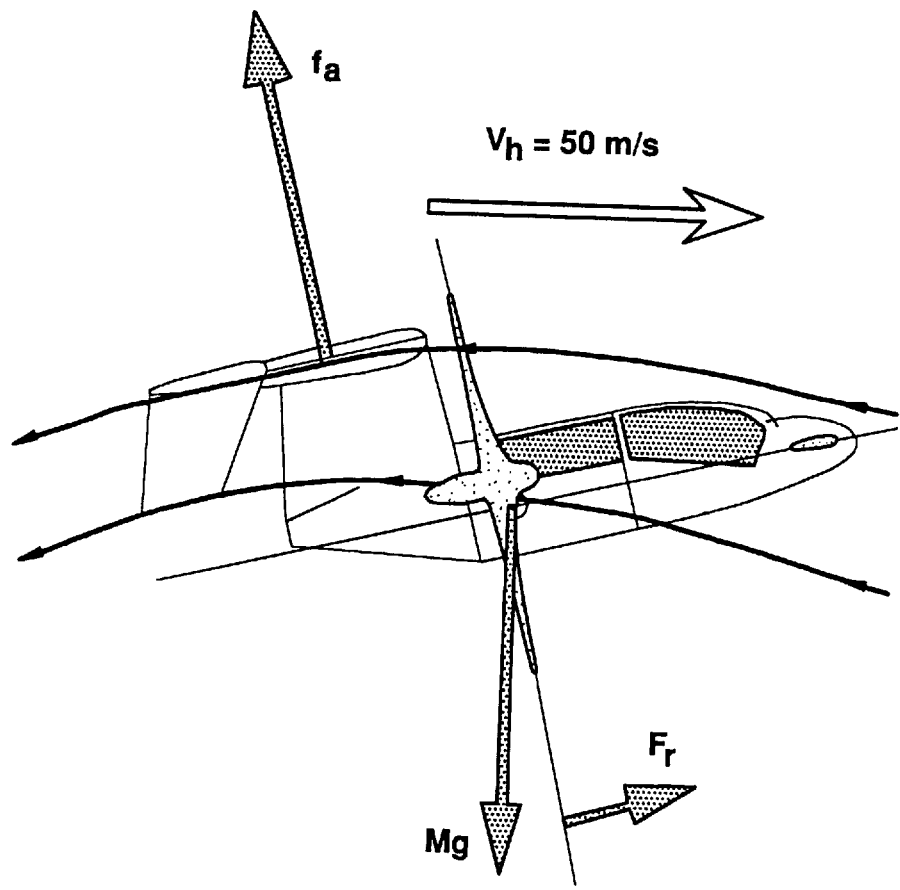
Figure 9B:
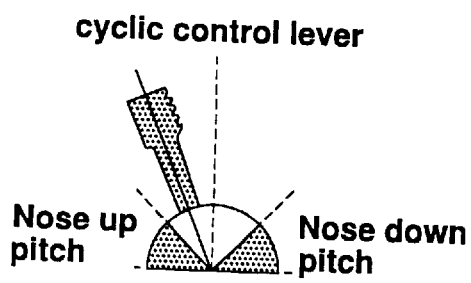
Figure 9C:
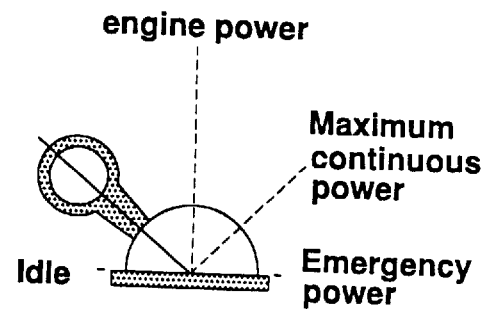
Figure 10A:
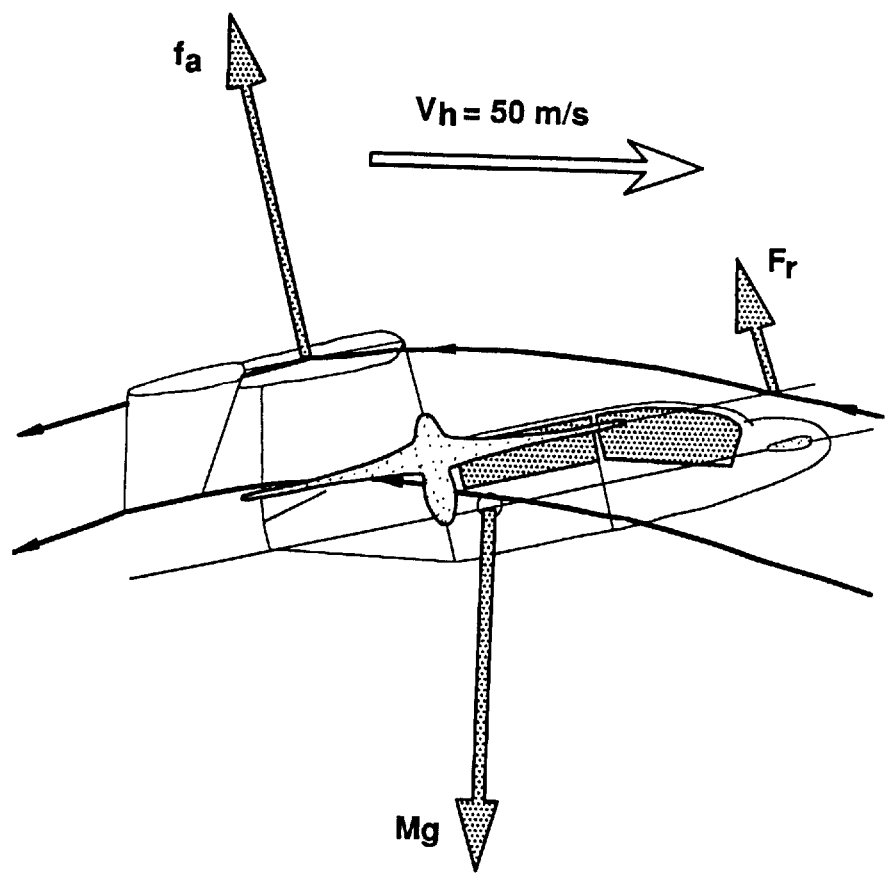
Figure 10B:
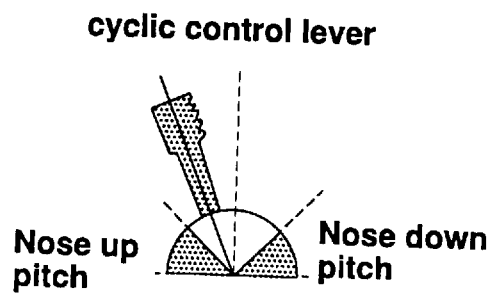
Figure 10C:
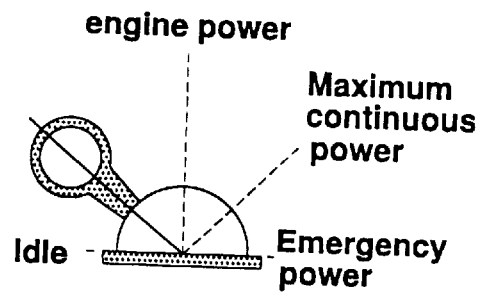
Figure 11A:
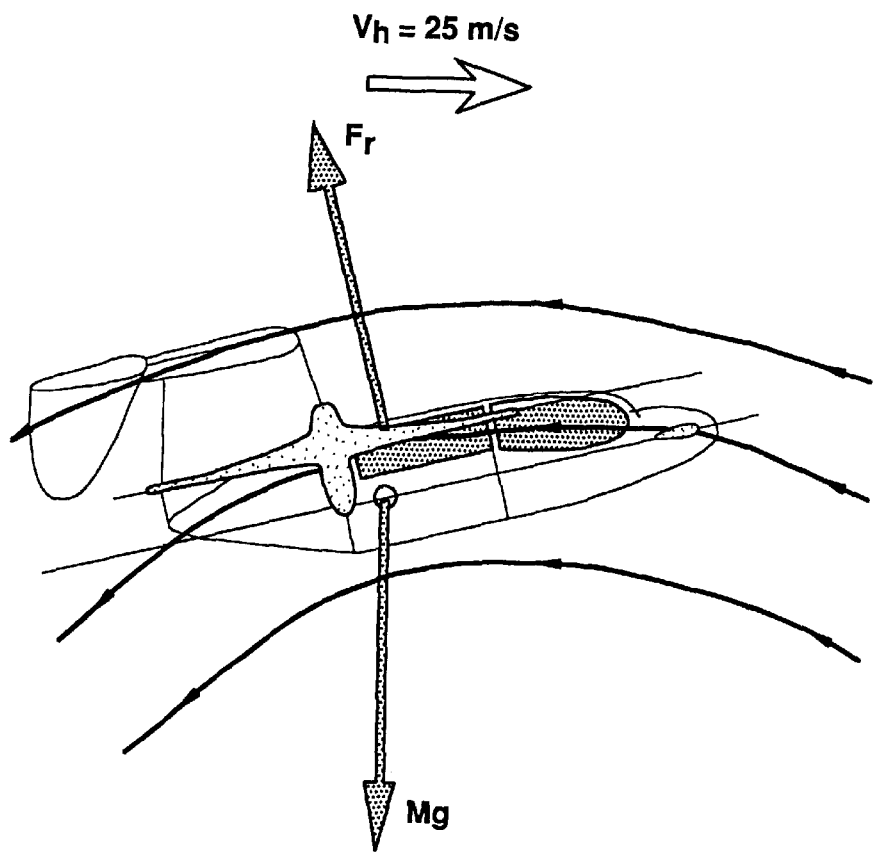
Figure 11B:
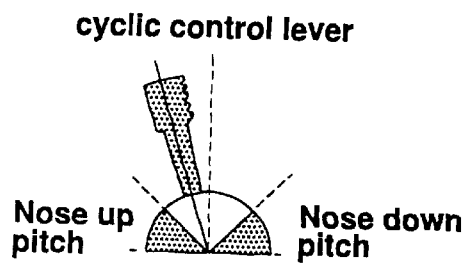
Figure 11C:
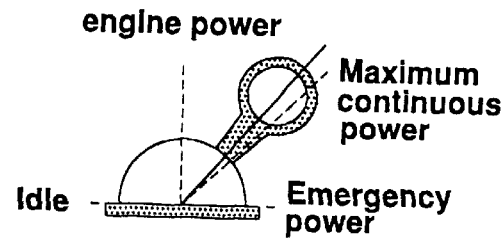
Figure 12A:
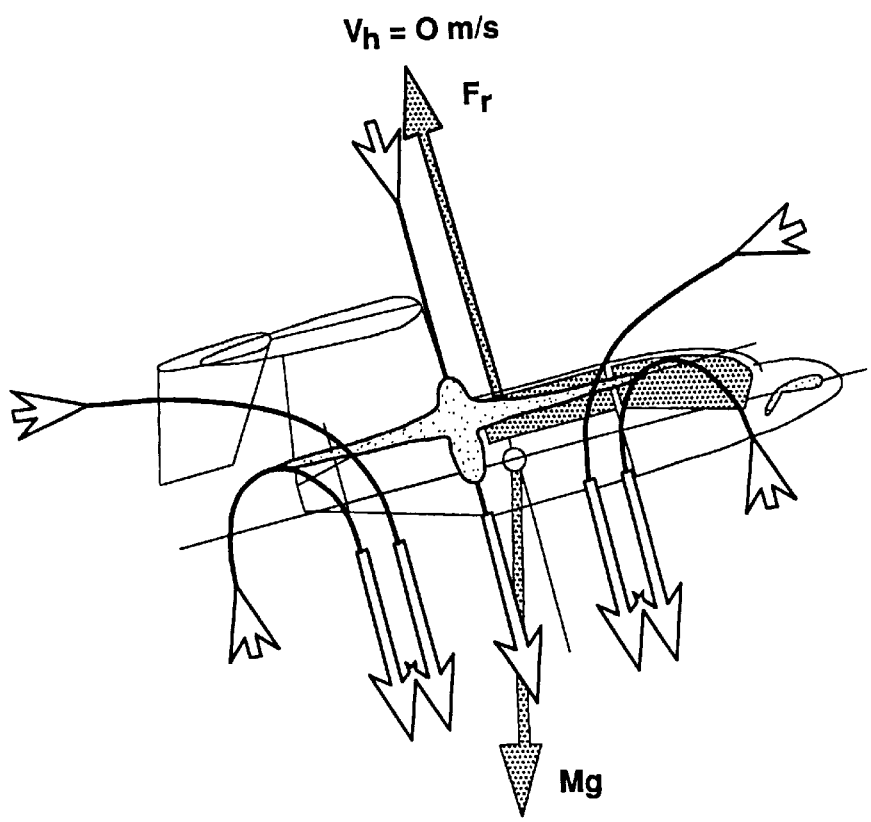
Figure 12B:
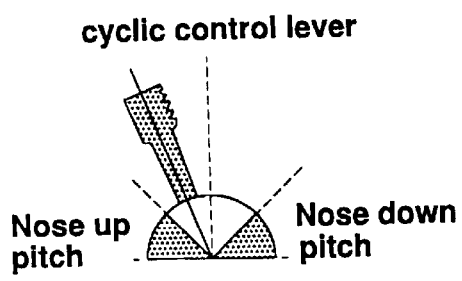
Figure 12C:
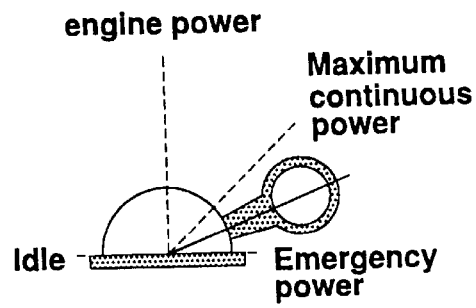
Figure 15:
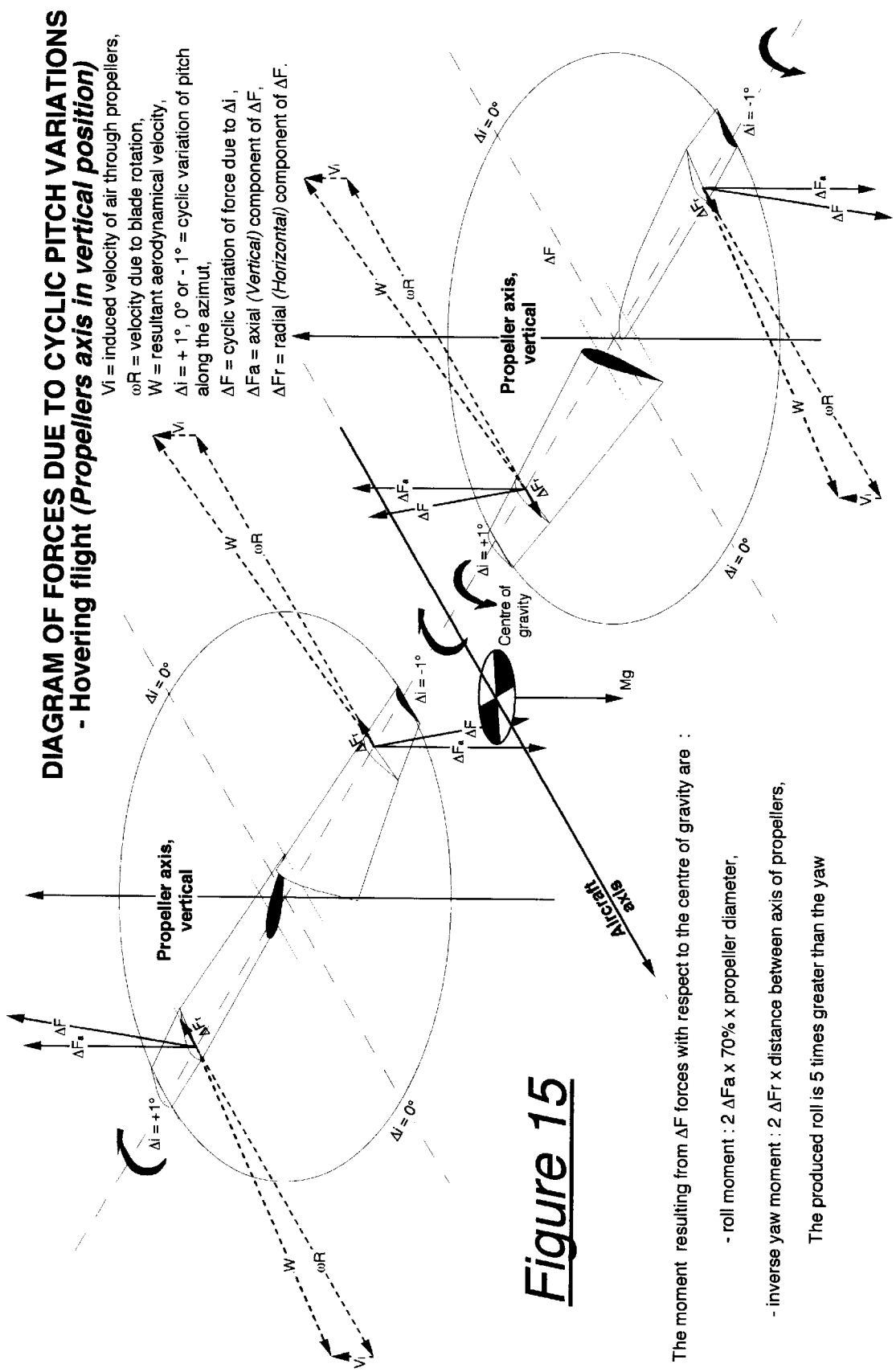
FIG. 15 depicts the forces resulting from lateral cyclic pitch variations during hover with the axes of the propellers in the vertical position.
Figure 16:
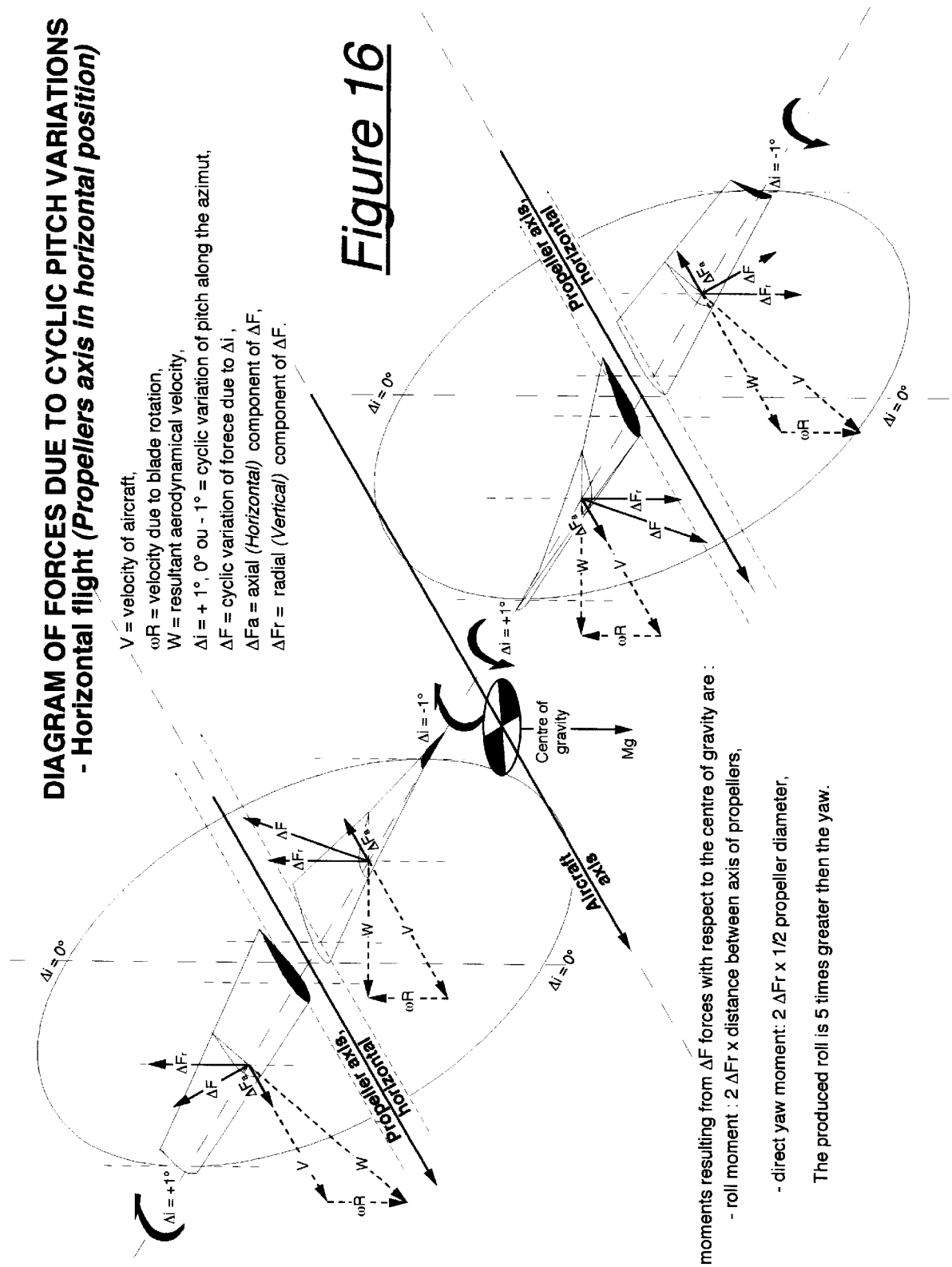
FIG. 16 depicts the forces resulting from lateral cyclic pitch variations during translational flight with the propeller axes in the horizontal position.
Figure 17:
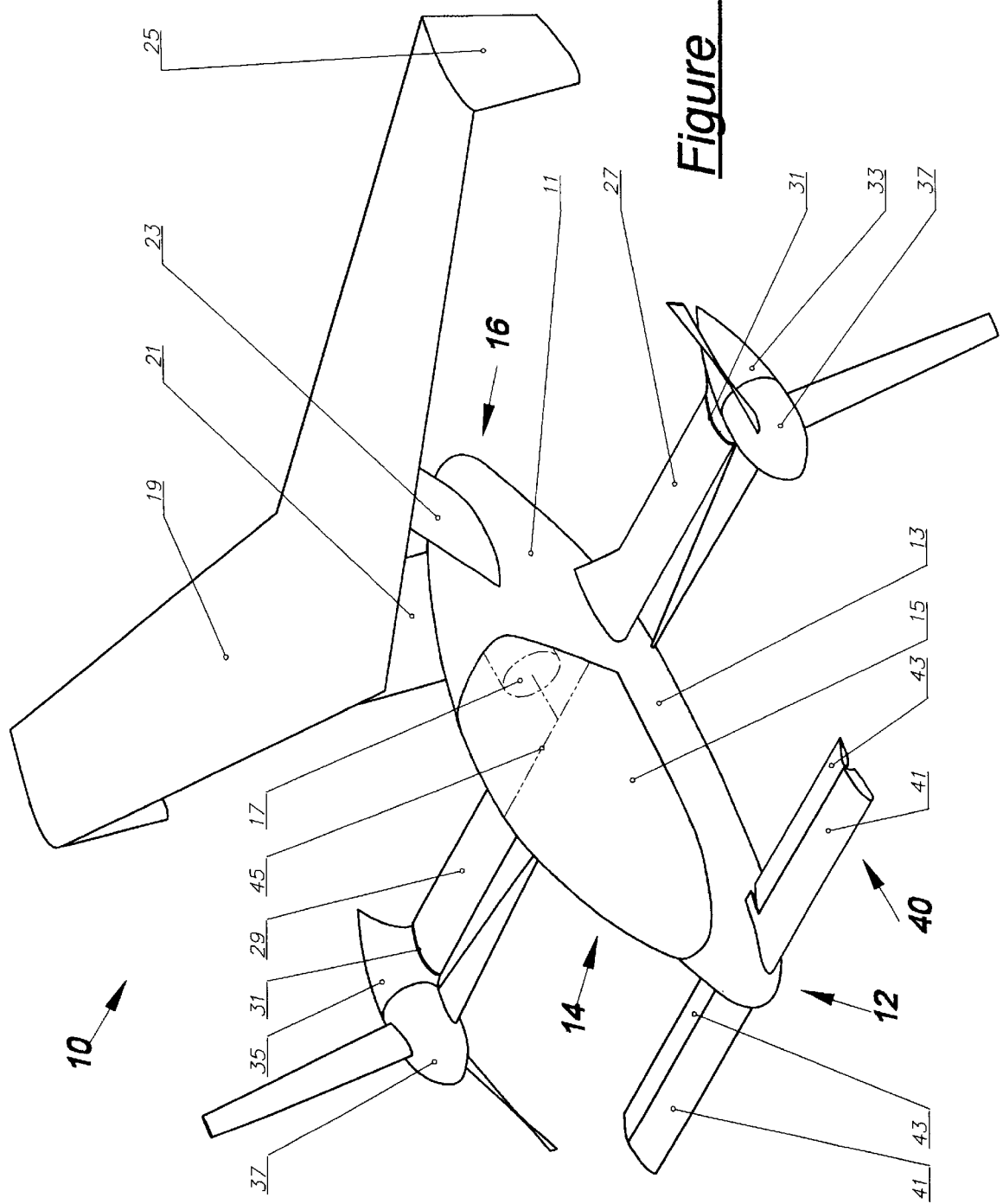
FIG. 17 shows a perspective view of the inventive aircraft looking from above the front left side thereof.

With reference, first, to FIG. 17, the inventive airplane is generally designated by the reference numeral 10 and includes a fuselage 11 having a cabin section 13 having a canopy 15 that may be opened in a manner well known to those skilled in the art to allow access to the cabin 14. The fuselage 11 has a forward end 12 and a rearward end 16.

At the rear of the cabin 14, engine means comprising one or more engines is/are located. One of the engines is shown schematically and is designated by the reference numeral 17. At the rear of the aircraft 10, a single wing 19 is mounted onto the fuselage 11 by fixed pylons 21 and 23. As can be seen in FIG. 17, the wing 19 has a generally V-shaped configuration and includes vertical fins 25 which depend downwardly from the extreme ends of the wing 19.

Each side of the fuselage 11 has mounted thereto a support boom with these support booms being respectively designated by the reference numerals 27 and 29. Each boom has an end distal from the fuselage 11 which includes a pivot 31 to which is pivotably attached a propeller nacelle with the left-hand nacelle being designated by the reference numeral 33 and with the right-hand nacelle being designated by the reference numeral 35. Each nacelle 33, 35 carries a rotary propeller 37 which may be rotated by the engines 17 in a manner to be described in greater detail hereinafter.

At the forward end of the fuselage 11, a horizontal stabilizer 40 is provided which includes two parallel, oppositely directed canards 41, each of which carries a single pivbtable flap 43 that may be operated by the pilot in a manner well known to those skilled in the art.

Figure 18:
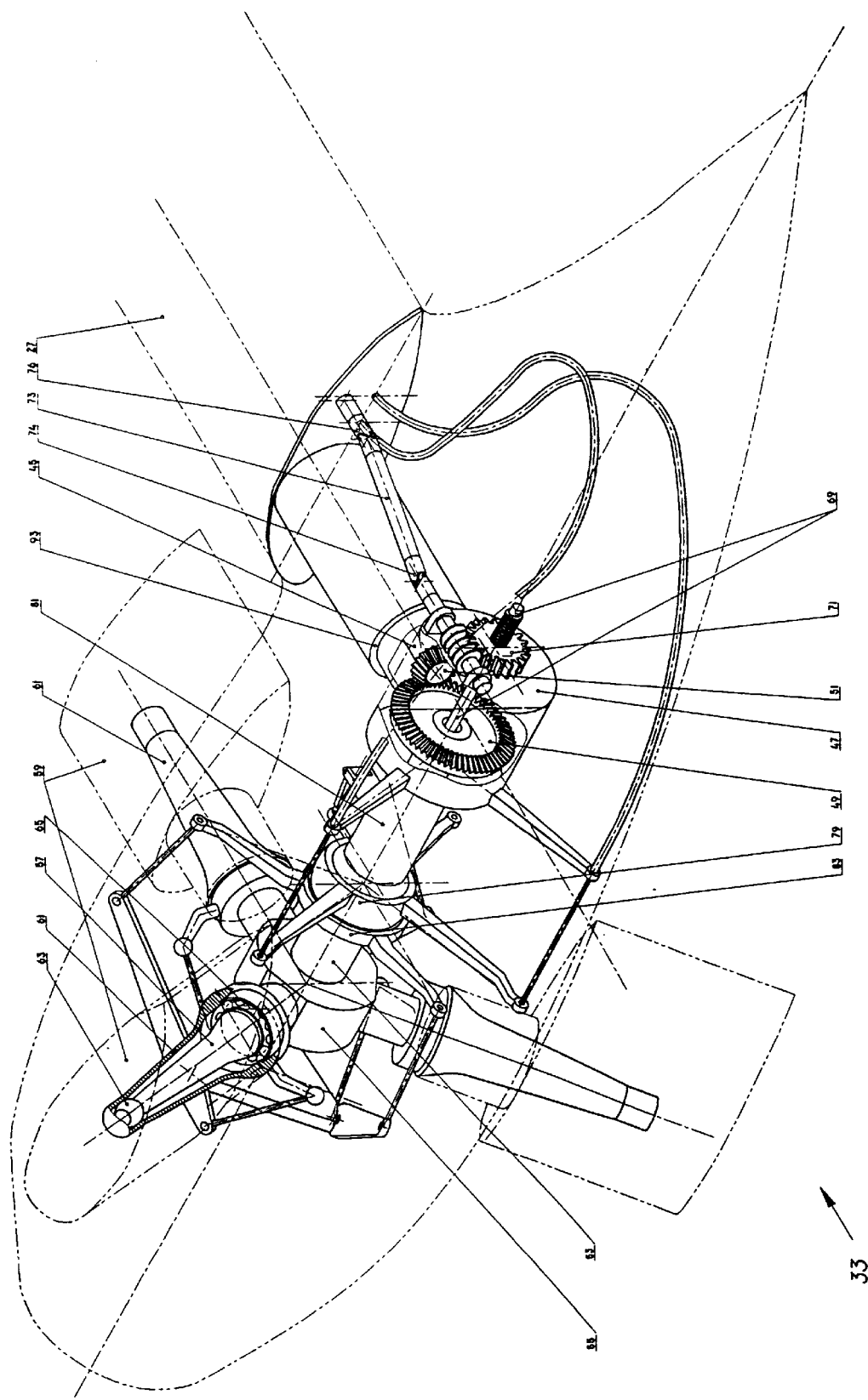
FIG. 18 shows a rear view of the left-hand propeller nacelle with portions broken away to show detail.
Figure 19:
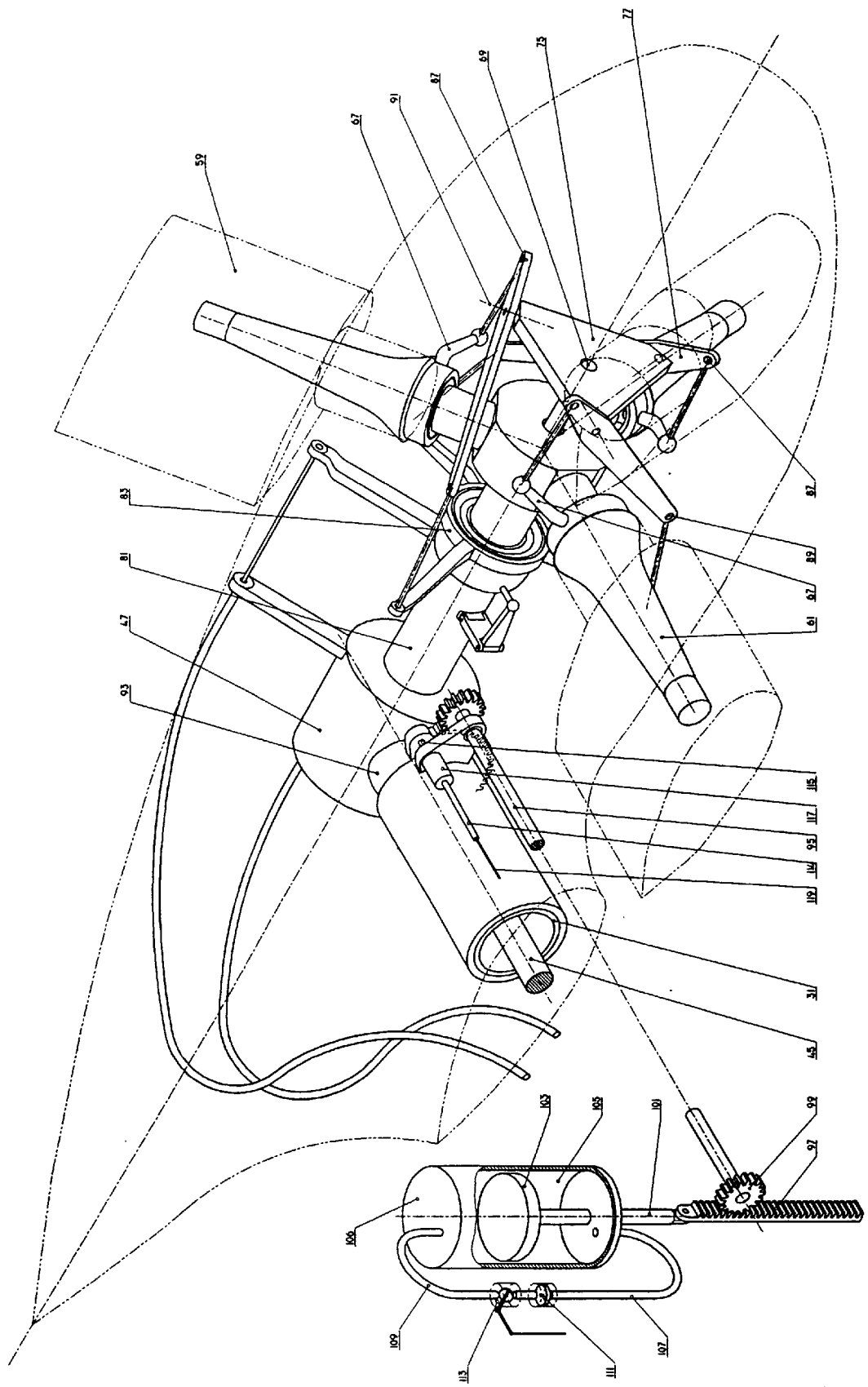
FIG. 19 shows a front view of the left-hand propeller nacelle and central assembly thereof, with portions broken away to show detail.
Figure 19:
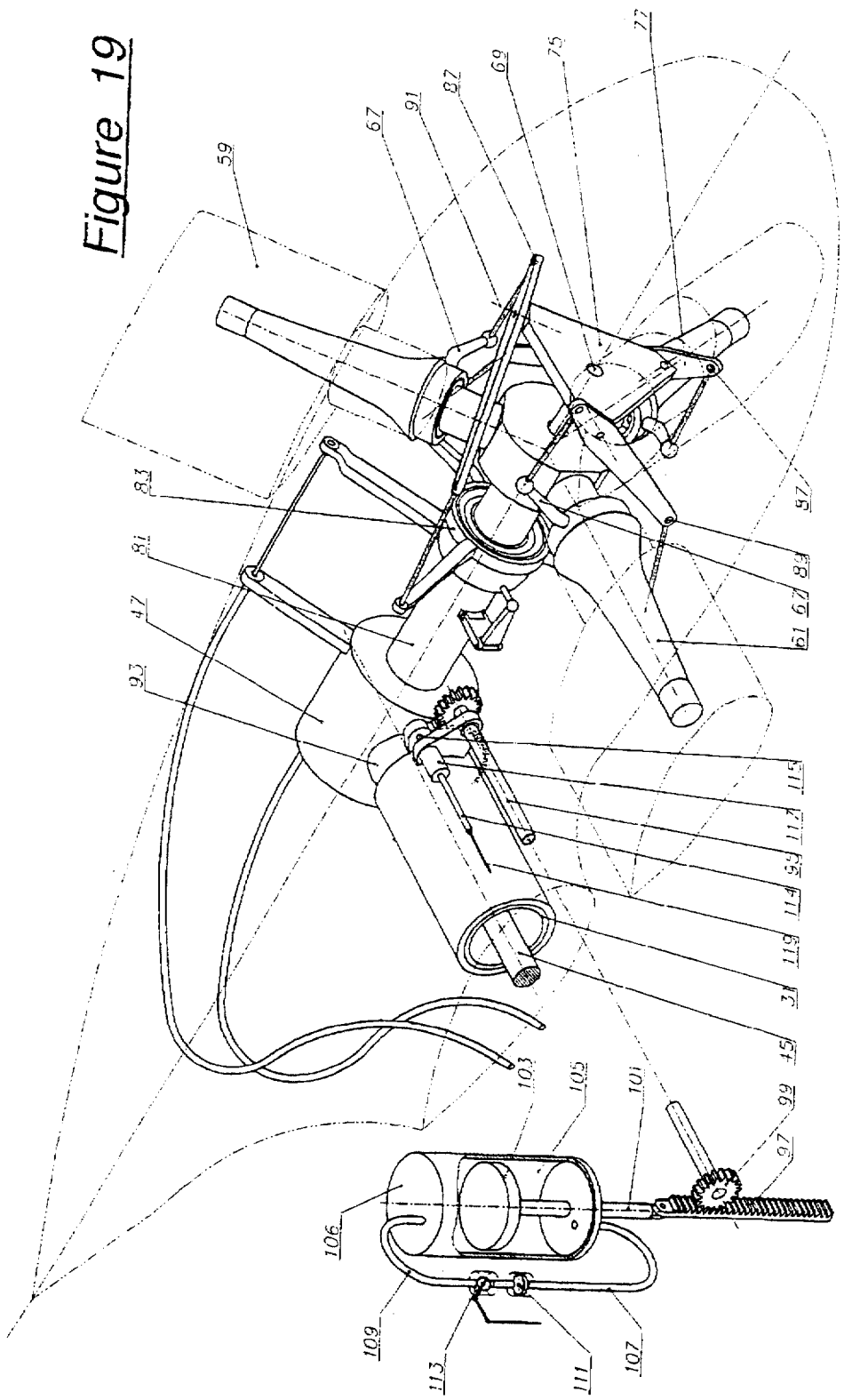

As explained above, FIGS. 18 and 19 show rear and front views, respectively, of the left-hand propeller nacelle 33. With reference to FIGS. 18 and 19, each propeller nacelle includes the components described hereinbelow.

Transmission means includes a transmission box 47 containing two conical gears 49 and 51 which cooperate so that rotations of the drive shaft 45 connected with one of the engines 17 are changed to rotations at a right angle thereto so that the propellers 37 may be suitably rotated. The propeller shaft 53. is hollow and is connected to a propeller hub 55 that includes, in the embodiment shown, three rigid spindles 57, each of which rotatably supports a propeller blade 59. The inventive aircraft includes pitch varying means.

With particular reference to FIG. 18, each blade has at its root an insert 61 which is connected to a respective spindle 57 by two bearings, one of which is designated by the reference numeral 63 and is a journal bearing and the other of which is designated by the reference numeral 65 and is a deep race oblique contact ball bearing. This bearing 65 absorbs centrifugal forces and the two bearings absorb forces and movements resulting from aerodynamic lift and drag while permitting each blade to controllably rotate about the spindle 57 to which it is mounted to permit pitch variation.

With reference to FIG. 19, the lever 67 traverses the axis of each propeller blade and is attached to the root of each blade to control its pitch. With reference to FIGS. 18 and 19, the collective pitch control assembly consists of an internal rod 69 which runs through the hollow propeller shaft 53 and protrudes from both ends thereof. At the rear end of the hollow propeller shaft, the rod 69 is axially actuated by a double mechanism 71 consisting of a screw and nut assembly which itself is actuated by a rigid rod 73 in torsion gimbled at 74 and 76 which acts identically on the left-hand and right-hand propellers 37 to keep their pitch synchronized. At the front end of the hollow propeller shaft 53, the internal rod 69 has a star-shaped assembly 75 attached thereto, each branch of which is attached to a pitch control lever 77.

The cyclic pitch control assembly consists of a swash plate 79 joined to the front of the transmission box 81. The longitudinal and lateral tilting of the plate 79 are controlled by the pilot. The cyclic pitch control assembly additionally includes another plate 83 that rotates with the propeller and includes as many arms as there are propeller blades 59.

On each blade, a pitch varying control lever 77 carries out the sum of the cyclic and collective pitch changes commanded by the pilot. At one end 87, the lever is attached to the blade pitch lever 67 using a small linkage rod. At the other end thereof, as designated by the reference numeral 89, the pitch control lever 77 is connected to the rotating cyclic plate 83 also employing a small linkage rod.

At a point near its mid-point, as designated by the reference numeral 91, the pitch control lever 77 is connected to the star-shaped assembly 75 of the collective pitch control. This arrangement of the star-shaped assembly 75, swash-plate 79, pitch control lever 77 and small linkage rods, carries out collective and cyclic pitch variation means hereinabove described.

With the swash-plate 79 in its neutral position, its rotating plate 83 is perpendicular to the propeller axis and does not transmit to the end 89 of the pitch control lever any axial motion. As such, this end 89 remains still. The star-shaped assembly 75 axially moves the mid-point 91 of the pitch control lever 77 and consequently its end 87 and the attached blade pitch lever 67, an equal distance for each blade, achieving the so-called collective pitch variation.

At any position of this star-shaped assembly 75, and value of blade collective pitch, if the swash-plate 79 is tilted from its neutral position by the pilot, the rotating plate 83 moves correspondingly. Then, the arm ends of plate 83 have to follow, axially, a sine or cosine function of their azimut. The axial motion of each arm end is transmitted to the end 89 of the pitch control lever 77 by the small rod, and from there to the end 87 of same lever 77 of which the mid-point 91 keeps the same given position as the star-shaped assembly 75, and eventually to the blade pitch lever 67. The choice by the pilot of the phase and amplitude of swash-plate 79 tilting allows him to give to the propellers the above-described lateral and longitudinal cyclic pitch variation.

In accordance with the teachings of the present invention, the propellers 37 tilt about a pivot 93 without the need for any mechanical control system. The central assembly includes a torsion rod 95 that makes up an elastic linkage. This torsion rod 95 transmits the tilt angle of the propellers 37 to the central assembly by way of a rack and pinion mechanism with the rack being designated by the reference numeral 97 and with the pinion being designated by the reference numeral 99. The torsional elasticity of rod 95 allows for a tilting differential of about 2° to 3° of each propeller with respect to the other. As best seen in FIG. 19, the rack 97 is connected to a rod 101 that has connected thereto damping means comprising a damping piston 103 that reciprocates within a hydraulic cylinder 105 having its ends interconnected via passageways or conduits 107 and 109 interconnected by a calibrated nozzle 111. The diameter of the nozzle is narrow enough to allow only small leak between both ends of the cylinder, and consequently, a slow rate of propeller tilt. A valve 113 is provided in the passageway 107 and may be controlled by the pilot in a manner well known to those skilled in the art to comprise a brake means or braking system which, when closed, prevents movement of the rack 97 and thereby the pinion 99. A blocking mechanism is provided to keep the propellers from tilting past the 90° position, which blocking mechanism consists of a simple stop, the upper wall 106 of the damping cylinder that limits the distance of extreme movement of the piston 103 within the cylinder 105.

A locking mechanism consists of a cog 114 which lodges itself in a hole 115 running through the center of the pivot 93. The cog 114 can be pulled out by an electromagnet 117 to unlock the locking mechanism and, as a backup, a cable 119 is provided should the electromagnet 117 fail.

Figure 20:
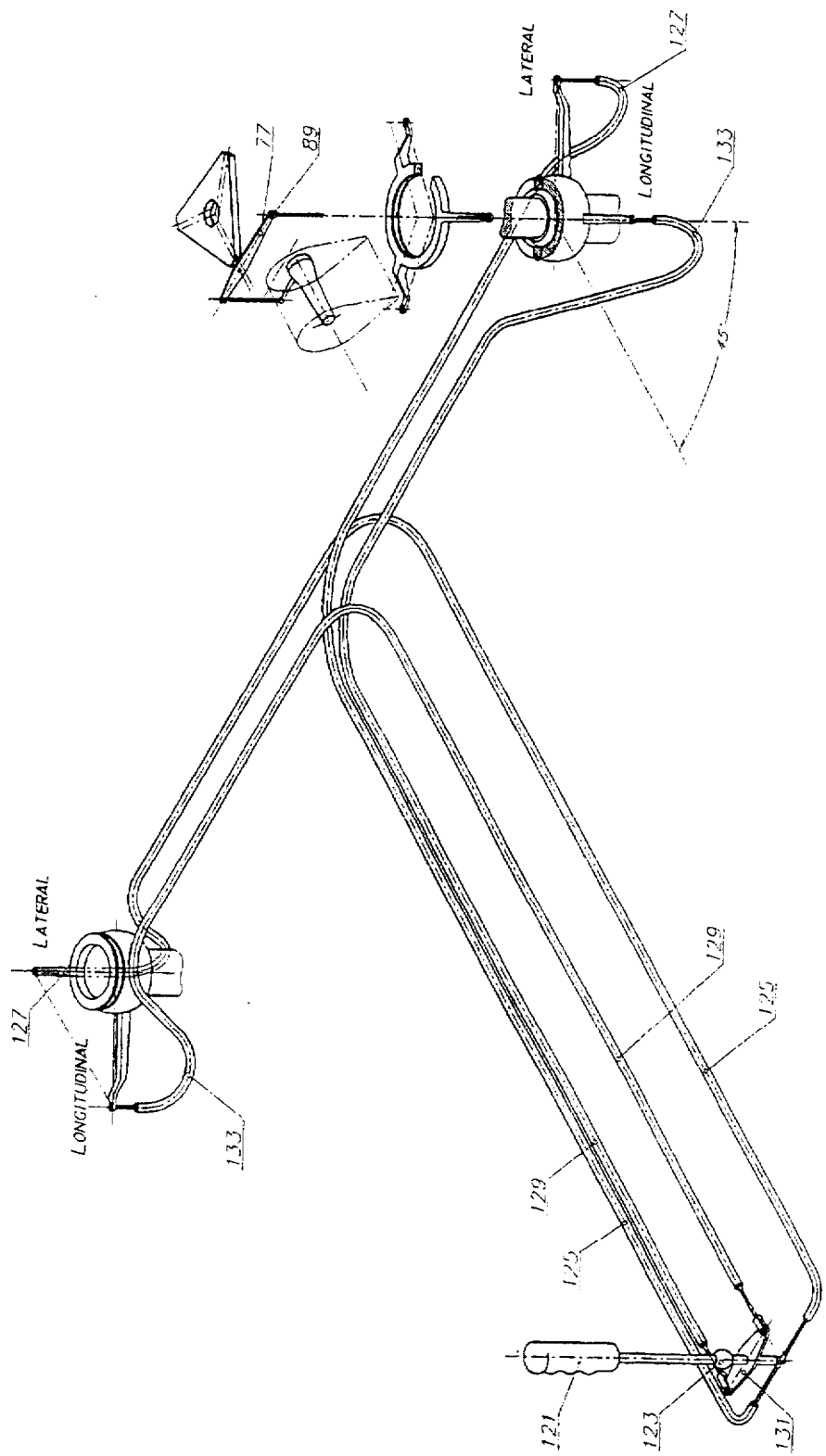
FIG. 20 shows a schematic representation of the general layout of flight controls of the present invention.

With reference to FIG. 20, control means for controlling operation of the aircraft includes the pilot's control stick 121 which is connected to a ball and socket type joint 123 that allows the stick to be moved front to back, left to right, and to be rotated along its own axis. The control stick 121 is directly connected to the cyclic control mechanisms located in the propeller nacelles by four flexible ball bearing control drives. Two of the drives, designated by the reference numeral 125, are connected underneath the cockpit floor boards to the bottom part of the stick and are actuated by left and right motions of the stick 121. The ends 127 of the drives 125 located in the propeller nacelles act on the lateral cyclic pitch control plates with exact compensation for the fact that the cyclic pitch control lever end 89 is out of phase with the actual blade azimut. The two other drives are designated by the reference numeral 129 and are connected under the floor boards of the cabin to a transverse lever mechanism 131 which itself is connected to the stick 121 and which moves as the stick is moved from front to back or is rotated. The ends 133 of the drives 129 located in the propeller nacelles act on the longitudinal cyclic pitch control plates, as explained hereinabove.

As will be explained in greater detail hereinbelow, these simple control connections are all that is necessary for all of the inflight maneuvers needed to fly the inventive airplane 10. Left and right motion of the stick 121 actuates anti-symmetric changes in the lateral pitch control plates thereby creating a rolling moment which rolls the aircraft. Forward and backward motion of the stick actuates symmetrical changes to the longitudinal pitch control plates thereby creating the pitching moment which allows the aircraft to pitch up and down. The same motion of the control stick 121 also allows for modification of the tilt angle of the propellers assuming that the brake valve 113 has been opened as explained herein. Rotating the control stick 121 actuates, through the transverse lever 131, anti-symmetrical changes to the longitudinal pitch control which, due to the elasticity of the torsion rod 95, in turn changes the tilt angle of the propellers and the direction of their prop wash. This creates the yawing moment necessary during low speed flight and during transitions between flight modes. Rotation of the control stick 121 replaces the rudder pedals found in a traditional airplane. If desired, however, rudder pedals could be installed and would therefore be connected to the transverse lever 131 in a manner well known to those skilled in the art. However, the configuration disclosed herein allows the pilot to fly the aircraft 10 with only one hand as opposed to using one hand and the pilot's feet. Variable degrees of response sensitivity to control inputs can be selected by carefully selecting the lengths of levels at both ends of the drive mechanisms 125 and 129 as should be understood by those skilled in the art.

With the above description of the present-invention in mind, with reference to FIGS. 17–20, reference is now made to FIGS. 1A–16 so that understanding of all operations of the inventive airplane 10 may be had.

The following descriptions of pitch control and transition maneuvers as well as roll and yaw control will enable the reader to understand how the three important design characteristics discussed above in the SUMMARY OF THE INVENTION are used to resolve the difficulties associated with the three design considerations outlined in the BACKGROUND OF THE INVENTION.

A first aspect concerns control of the aircraft with respect to symmetric degrees of freedom, namely aircraft pitch and the tilting of the propellers.

Concerning engine power and propeller pitch, as is well known to those skilled in the art, symmetrically acting motion will be affected by the speed at which the propellers rotate as well as by the power output of the engines 17. The effects of propeller speed and engine power are assumed to be regulated and dealt with in accordance with known principles, allowing the pilot to concentrate on the aircraft's pitch and the tilting of the propellers. For example, in a typical airplane, the two synchronized propellers are equipped with a device which allows for identical variations in propeller pitch, variations made by a pitch-control actuator mechanism. The pilot has controls that allow him to choose prop rev settings for each individual phase of flight, for example "take-off rev" or "cruising rev". Once a setting has been chosen, it is kept for the duration of the entire phase of flight; no pilot inputs are necessary for the minute changes that must be continually made to the prop rev settings during flight. An internal regulator makes continuous minute changes in prop pitch to ensure that the propellers are running at the appropriate rev to maintain the chosen phase of flight.

Additionally, the pilot controls the power setting of the engines 17 using throttle levers which he or she works with the left hand. The throttles are linked together such that identical power changes are made to each engine, when all engines 17 are functioning properly. In case of engine failure, the pilot can compensate for the loss of power in the failed engine by increasing power in the remaining engine (s). This emergency procedure can be automated using currently available methods, freeing the pilot's left hand from having to constantly be on the throttles.

Using the above existing control methods as baseline reference, the airplane pitch and propeller-tilting control techniques in accordance with the teachings of the present invention are as follows:

Aircraft pitch control:

The aircraft's pitch is controlled by symmetric changes of the longitudinal component of cyclic prop pitch. These changes in pitch cause a pitching moment which is applied to the propellers by external aerodynamic forces. This moment is transferred from the propellers, through the central assembly, to the fuselage 11 by passing through the damping system, the blocking mechanism, the locking mechanism, and the braking system. These structures are described above with reference to FIGS. 17–20.

As the moment passes through the damping system, its magnitude will be reduced by an aerodynamic moment due to the speed at which the propellers are tilting. However, the tilting speed of the propellers (0.75 revolutions per minute [rpm]) is low enough when compared to the rotational speed of the propellers (600–1200 rpm) that the moment due to the tilt speed of the propellers can be neglected.

This method of cyclic pitch control is nearly identical to that used by conventional helicopters. This method allows for the absence of a pitch control tail rotor and eliminates the need to have dual tandem main rotors.

Furthermore, this method of cyclic pitch control is unaffected by the horizontal velocity of the aircraft or by the tilt angle of the propellers. This technique is therefore highly effective and can be used in all phases of flight, regardless of whether the aircraft is taking-off, landing, cruising in level flight, or transitioning between vertical and horizontal operating modes.

Tilting the propellers:

The following sections describe what takes place as the aircraft transitions from vertical to horizontal flight, and then back again. The descriptions are in a numbered step-by-step format. Each step is further explained by a correspondingly numbered Figure. Each correspondingly numbered Figure includes three sub-figures labeled A, B and C, respectively. In each case, the "A" Figure depicts a schematic representation of the position and orientation of the aircraft; sub-figure "B" depicts a schematic representation of the position of the cyclic control lever of the aircraft; sub-figure "C" depicts a schematic representation of the position of the throttle control lever of the aircraft.

Step 1. The aircraft has taken off vertically and is hovering over the airfield. The pilot has reviewed any checklist-type items and has selected the appropriate propeller rev and power settings. The pilot, as part of his or her checklist, has made sure that the flaps 43 on the canards 41 are fully extended.

While the aircraft is hovering, the airflow being sucked downward by the propellers has a very low velocity as it passes over the wing 19 and the canards 41. The aerodynamic forces resulting from the airflow over the wing 19 and the canards 41 are negligible, resulting in no negative lift. At this point, the aircraft is controlled solely by the propellers, which also provide all lift.

By design, the aircraft's center of gravity is located forward of the axes about which the propellers pivot and forward of the booms 27 and 29. The forward location of the center of gravity is necessary to maintain aircraft pitch stability at low speeds. The weight of the aircraft applied at the center of gravity with respect to the propellers' pivot axis causes a moment which results in downward pitching of the nose of the aircraft. This moment must be balanced by an upward pitching moment created by the cyclic pitch of the propellers. To account for this moment, the pilot must have the cyclic pitch control in a position aft of the neutral position and a high power setting to maintain steady and level hover. The moment caused by the propellers and the moment caused by the forward positioning of the center of gravity cancel each other out as they pass through the blocking mechanism and the braking system.

Step 2. The pilot decides to transition from vertical to horizontal flight, and begins to do so by increasing engine power slightly and pitching the nose of the aircraft down. For example, if the pilot decides to accomplish this maneuver with an acceleration of 8.2 fps$^2$ (0.25 gs), the thrust required is found by $\sqrt{(1^2+0.25^2)}=1.03$, which corresponds to 3% more thrust than the weight of the aircraft.

Furthermore, the angle of downward pitch required for the maneuver is found by $\tan^{-1}(0.25)=14°$. Therefore, at this point in the transition, the aircraft must have a value of thrust equal to 103% of its weight and a downward pitch angle of 14°.

At this point, the airflow generated by the propellers follows the same pattern, in relation to the plane as it did in Step 1. This means that the propeller wash is tilted downward and backward at an angle of about 14° with an imaginary line passing through the center of gravity. After about 5 seconds in this configuration, the aircraft attains a horizontal velocity of 41 fps. A full 10 seconds after having begun the transition from vertical to horizontal flight, the aircraft has attained a horizontal velocity of 82 fps.

Step 3. At these slow horizontal speeds, the airflow around the wing is bent downward by the propellers causing it to flow onto the top of the wing 19. This causes a negative lift force ($-f_a$) on the wing which in turn causes an upward pitching moment to act on the aircraft. Around the canards 41, the airflow remains unaffected by the propellers. Since the flaps 43 located on the canards 41 are fully extended, the canards 41 produce positive lift ($f_c$) which creates a second upward pitching moment acting on the aircraft.

The moment created by the negative lift of the wing and the moment created by the positive lift of the canards 41 with their flaps 43 extended add up to create a larger upward pitching moment, the magnitude of which increases as the forward velocity of the aircraft increases. This moment begins to compensate for the downward pitching moment caused by the forward location of the center of gravity of the aircraft. Eventually, these two opposite moments cancel each other out, and as the horizontal velocity continues to increase, the upward pitching moment becomes greater than the downward pitching moment.

As a consequence, as the aircraft picks up speed, the pilot must, progressively, move the cyclic control forward from the aft position it had in Steps 1 and 2 of the neutral position to counter the tendency of the nose of the aircraft to pitch up. This causes the lift force vector to act on a point behind the center of the propellers. At this point, the one way stop of the blocking mechanism is no longer pressed on, the closure of the brake valve 113 is the only reason that the propellers' axes are still in the vertical (90°) position.

Step 4. In order for the propellers to tilt forward, the brake valve 113 must be opened. When it is opened, the propellers will begin to pivot forward of their own accord. On a variant of the aircraft constructed without the pilot controlled braking mechanism, the propellers would begin tilting forward as soon as the cyclic control lever is moved forward beyond the neutral position.

While the propellers are in the process of tilting forward, the moments caused by changes in cyclic pitch, with a small reduction as explained hereinabove, are transmitted to the aircraft through the damping system. The caliber of nozzle 111 has been selected to be narrow enough to restrain the tilting speed of the propellers to very low values (0.75 rpm=4.5 degrees/s) so that there is no appreciable change in the control moments applied by the pilot through cyclic pitch adjustments.

During this step of the transition, the pilot's only job is to maintain the aircraft's acceleration at its desired value and the climb trajectory along its desired path. Any necessary corrections are made using the cyclic pitch control lever. For example, if the aircraft is climbing more than desired, all that is necessary to correct the path deviation is to move the cyclic control lever forward to lower the nose.

As far as the tilting of the propellers is concerned, what actually happens during the early stages of the transition from vertical to horizontal flight is that the propellers themselves do not rotate downward, but, rather, the rest of the aircraft rotates upward. That is to say that the propellers do not move relative to the ground, but the aircraft itself does. The aircraft rotates from the original nose down attitude it held in Step 2, to a level attitude, and then to a nose up attitude. This rotation of the fuselage 11 reduces to elimination the negative lift caused by the main wing 19 and its resulting upward pitching moment. The loss of the upward pitching moment is compensated for by increasing lift ($f_e$) being produced by the canards 41 with their flaps 43 still extended.

At this point, as the aircraft's horizontal velocity is only 32–64 fps, most of its lift is still being produced directly by the propellers. However, as the horizontal velocity increases and the aircraft begins to pitch up, lift begins to be produced in increasing amounts by the wing 19 and the canards 41.

Up to this point, the power has been at its maximal, emergency setting. Once the horizontal velocity of the aircraft reaches 82 fps, the power required for the aircraft to maintain its position without accelerating is inferior to the maximum amount of power produced by one engine. Therefore, the pilot is free to throttle the engines 17 back to a lower power setting.

Step 5. About ten seconds later, the aircraft attains a horizontal velocity of 164 fps. At this speed, the wing and the horizontal stabilizer 40 provide enough lift ($f_a+f_e$) to account for the weight of the aircraft (Mg). If not. already done, the pilot can release the brake pressure to allow the propellers to move to their fully horizontal position.

Step 6. The forward transition is complete. The propellers are at their fully horizontal position and are locked into this position using the pilot controlled locking mechanism. The aircraft accelerates to its climbing speed of 227 fps, and then to its cruising speed of 328 to 410 fps (actual cruise speed depends on aircraft altitude). It is now, for all intents and purposes, an airplane. Its angle of attack and trim are reduced in order to lift the aircraft at all speeds and altitudes.

The canard flaps 43 are used by the pilot to trim out the aircraft, so that the cyclic control can be left near the neutral position without any permanent pilot's strain.

Propeller pitch and the power setting of the engines 17 are chosen based on the necessary configurations for climb-out, and then for cruise.

Step 7. The aircraft is in full cruising configuration; the canard flaps 43 have been retracted and the cyclic pitch control is near the neutral position. The thrust acts along the central axis of each propeller.

The aircraft is in level flight at a speed between 328 fps and 410 fps. The pilot begins the aircraft's descent. The aircraft is slowed to 164 fps as the pilot pulls the throttles back to reduce power. The wing's angle of attack increases and the pilot compensates by extending the canard flaps 43 in order to balance out the wing's lift and to maintain the cyclic control near the neutral position.

When the aircraft reaches a horizontal velocity of 164 fps, the pilot stabilizes the descent at a rate of −10 fps and a slope of 6%.

Step 8. The aircraft's configuration at this stage of backward transition is similar to the aircraft's configuration during Step 6. However, engine power is reduced, since the aircraft is descending instead of climbing or accelerating.

Before beginning the actual transition from horizontal to vertical flight, the propeller revs are set to the appropriate setting. This setting is similar to the take-off setting, both of which are higher than the cruise setting.

Step 9. The beginning of the actual transition from horizontal back to vertical flight begins as the pilot retracts the canard flaps 43. Since the flaps 43 have been retracted, the moment caused by the lift of the wing must now be balanced by an upward pitching moment caused by the propellers. As the pilot retracts the flaps 43, he or she must also pull back the cyclic control to maintain the aircraft's attitude. At this point, the propellers' thrust acts parallel to their central axis and is applied at a low point of the propeller disk.

Step 10. The locks securing the propellers to the boom are released and the valve 113 is opened. The propellers slowly pivot upward as a result of the upward pitching moment caused by the cyclic propeller pitch. All aerodynamic moments are transmitted from the propellers to the fuselage 11 through the damping system.

After 10–20 seconds, the propellers have gone from the fully horizontal axis position (0°) to the fully vertical axis position (90°). The propellers stop pivoting as they come to rest against the blocking mechanism. Once the propellers have reached the 90° position, all aerodynamic moments are transmitted from the propellers to the fuselage 11 through the blocking mechanism.

As the propellers tilt backward, the thrust they provide is weak, and most of the lift is produced by the horizontal stabilizer 40 and the main wing ($f_a+f_e$).

Step 11. The pilot proceeds with the transition from horizontal to vertical flight by further slowing down the aircraft. Engine power is increased, resulting in increased pitch and thrust. The aircraft is kept at a slight nose up attitude, so that the thrust has a backward component and helps to slow down the aircraft.

At this point, the wash of the propellers causes an airflow pattern which lowers the angle of attack of the wing and reduces the amount of lift produced by the wing. As the aircraft slows to a horizontal velocity of 82 fps, most of the lift production is transferred from the wing to the propellers. Lift produced by the horizontal stabilizer 40, with the flaps 43 retracted, is negligible.

The pilot commits to finishing the backward transition by preparing to set the aircraft down as soon as the landing area is in sight. Engine power is once again increased, and the nose of the aircraft is pitched up even higher. The propeller wash acts as it did in Step 3, resulting in negative lift being produced by the wing. However, the aircraft's nose up attitude as well as its downward trajectory cause the negative lift produced to be much less than that produced during Step 3. Furthermore, the aircraft's flight configuration also ensures that the propellers will remain pressed against their vertical stop and will not pivot downward. The cyclic control lever is kept pulled back to ensure that the propellers continue to rest against the vertical stop.

Step 12. At extremely low speeds, the airflow generated by the propellers becomes similar to that in Steps 1 and 2. To complete the backward transition, the pilot adjusts the power to maintain the aircraft's desired altitude as he or she positions the aircraft over the landing site. Then, the pilot sets the aircraft down as would be done with a conventional helicopter.

Control of the aircraft with respect to anti-symmetric degrees of freedom, namely aircraft roll and yaw may be explained as follows:

When the aircraft is hovering or moving at extremely low speeds, roll control is achieved by anti-symmetric variations of lateral cyclic pitch, without changing the general pitch of the propellers. These variations are commanded by the pilot by way of moving the cyclic pitch control lever left or right. The general propeller pitch must remain at an equal setting for each propeller. The cyclic variations cause lift differentials on the right and left halves of the propeller disks. The lift differentials lead to roll inducing moments that are transmitted through the propeller hubs and the booms to the fuselage 11. The roll inducing moments are highly effective, and can be generated by cyclic pitch variations of only 2° or 3°. Furthermore, the amount of pressure exerted by the pilot on the control lever to affect the pitch changes is minimal, and therefore does not require any sort of mechanical boosting system. Such a boosting system would be necessary if changes were being made to collective propellers pitches.

Yaw control is achieved by anti-symmetric changes to longitudinal cyclic pitch. The use of symmetric changes to longitudinal cyclic pitch as a method of aircraft pitch control has already been discussed. In the case of yaw control, the opposing pitching moments caused by the changes in cyclic pitch in each propeller cancel each other out. However, due to the elasticity in the linkage rod, each propeller can tilt 2° or 3° out of phase with the other (anti-symmetrically). As a result of the differences in tilt angles, and the resultant differences in fore and aft components of lift of each propeller, a yawing moment is created. The magnitude of this moment is great enough that it will cause the aircraft to yaw.

As a side note, during low speed flight, it is important to have a highly effective yaw control mechanism to compensate for wind gusts and air side-slip angle of the aircraft due to lateral winds.

The method for roll control described above can be effectively used during high speed level flight. This means that the same method of roll control can be used for all phases of flight. At high speeds, the anti-symmetric variations of lateral cyclic pitch cause radial forces which act in the plane of rotation of the propellers. These forces are the cause of the rolling moment.

The reasons behind the radial lift forces caused by the propellers require an explanation. A graphical explanation is given in FIGS. 15 and 16. The radial lift force is due to the high value of axial speed through the propeller, and the subsequently large increase in general pitch. For example, at a cruising speed equal to tip speed of the propeller blades, there exists a general pitch angle of 45° at the extremity of each blade. Furthermore, the general pitch angle is even greater at locations on the blade which are closer to the blade's root. In a case where cruising speed is half that of the tip speed of a blade, half of the length of each propeller blade, from 0 to 0.5R, is at a general pitch angle greater than 45°. In these conditions, a variation of lateral cyclic pitch causes differences in lift between the right and left sides of the propeller disk. (The propeller disk is the imaginary disk created by the rapid rotation of the propellers). The lift component in the plane of the propeller disks is greater than the axial lift component. The components in the plane of the propeller disks are added together between the left and right sides of the propeller disks, resulting in a significant radial lift force. If the right propeller is rotating clockwise and the left propeller is rotating counter-clockwise, the moment caused by the radial lift acts in the same direction as the moment induced by the propellers when the aircraft is hovering. Therefore, this technique of using lateral cyclic pitch variations for roll control is effective during all stages of flight and can be used from take-off to touchdown as the sole method of roll control.

As far as anti-symmetric variations of longitudinal cyclic pitch are concerned, if the locking mechanism was not locked, as during slow flight, an anti-symmetric tilting of the propellers would result in an additional rolling moment but no yawing moment. Therefore, it might seem necessary to develop some control mechanism for yaw control during high speed, level flight. However, as a characteristic of the invention, and to simplify the aircraft, such a control mechanism is not necessary and therefore not present in the aircraft.

Unlike at slower speeds, the airflow passing around the aircraft at high speeds acts on the vertical stabilizers (fins 25) attached to each end of the wing 19 to give the aircraft required yaw stability. Therefore a yaw control mechanism is not necessary when the aircraft is in high speed, level flight. As is the case in other conventional airplanes traveling at high speeds, only pitch and roll control mechanisms are necessary and therefore are the only two control mechanisms the pilot has at his or her disposal while this particular aircraft is in high speed, level flight. Roll control is all that is necessary for the aircraft to be able to turn effectively, so the propellers are locked at the 0° position and anti-symmetric variations of longitudinal cyclic pitch are not used.

When the aircraft is transitioning between vertical and horizontal flight modes, the control methods described above for low and high speed flight remain effective and can be used. Anti-symmetric changes to the lateral component of cyclic pitch cause the aircraft to roll, and also induce a negligible amount of yaw. This is to say that when the airplane rolls right, it also turns right, but not enough to be of any concern. Anti-symmetric changes to longitudinal cyclic pitch result in yaw when the aircraft is flying at a moderate speed and the propellers are only slightly tilted. As the aircraft's horizontal velocity increases, though, a relatively small and negligible amount of roll is produced. However, the need to control yaw is eliminated as the aircraft accelerates to its cruising speed due to the yaw stability provided by the wing's fins 25.

It is important to note that the benefit of the radial lift force generated by the propellers is directly linked to the second design characteristic of the invention, the combination of a variable cyclic pitch propeller and a rigid hub. The radial lift is linked to a moment passing transversely through the propeller due to the significant amount of general propeller pitch (45°). A helicopter rotor with hinged blades is by design unable to transmit such a transverse moment and would act on its own to compensate for and therefore eliminate the moment, and with it all radial lift. A conventional airplane propeller, which is not able to have its cyclic pitch varied, cannot be manipulated by the pilot to generate any radial lift.

As such, an invention has been disclosed in terms of a preferred embodiment thereof which fulfills each and every one of the objects of the invention as set forth hereinabove, and provides a new and useful vertical takeoff and landing aircraft of great novelty and utility.

Of course, various changes, modifications and alterations in the teachings of the present invention may be contemplated by those skilled in the art without departing from the intended spirit and scope thereof.

As such, it is intended that the present invention only be limited by the terms of the appended claims.

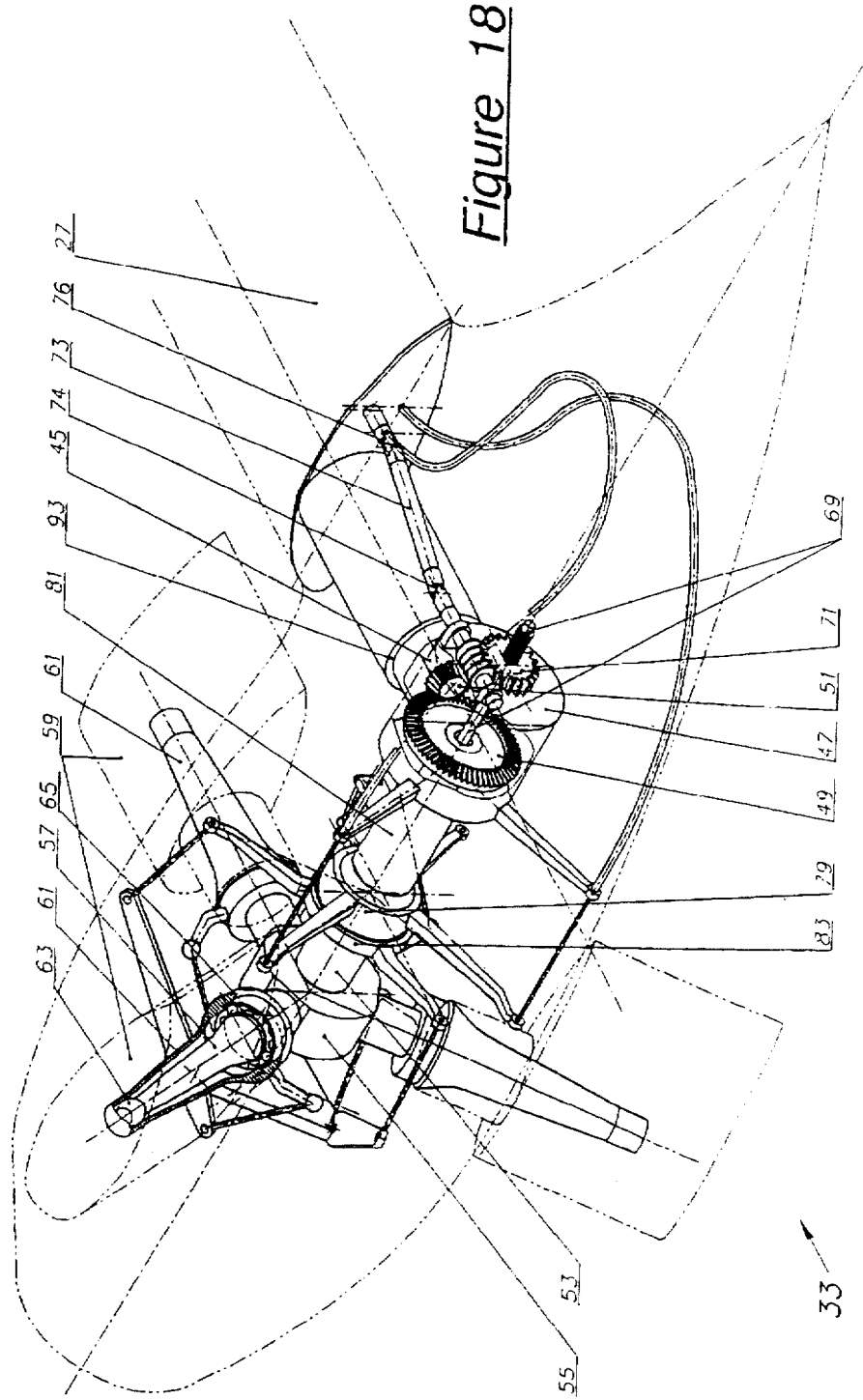

I claim:

1. A vertical takeoff and landing aircraft, comprising:
  a) a fuselage having a forward end and a rearward end;
  b) a wing mounted on and extending from said rearward end;
  c) a horizontal stabilizer mounted on said forward end;
  d) a pair of opposed booms independent of said wing and extending laterally of said fuselage between said wing and horizontal stabilizer;
  e) each boom having an end distal of said fuselage to which is mounted a propeller nacelle carrying an unshrouded propeller having an axis of rotation, each nacelle being freely pivotable about a pivoting axis, each propeller having a plurality of propeller blades;
  f) engine means for driving said propellers;
  g) each propeller nacelle being pivotable between a first position wherein said axis of rotation is approximately horizontal and a second position wherein said axis of rotation is approximately vertical; and
  h) brake means for restraining free pivoting movements of said nacelles, whereby release of said brake means permits free pivoting of said nacelles.

2. The aircraft of claim 1, having a center of gravity forward of said booms.

3. The aircraft of claim 1, wherein said wing includes two opposed ends each of which carries a fixed downwardly extending fin, said wing being supported above said fuselage and free of propeller downwash.

4. The aircraft of claim 1, wherein said horizontal stabilizer includes two oppositely directed canards each of which includes a single pivotable flap.

5. The aircraft of claim 1, wherein said wing is generally V-shaped.

6. The aircraft of claim 5, wherein said wing includes two opposed ends each of which carries a fixed downwardly extending fin.

7. The aircraft of claim 1, wherein each propeller is driven by said engine means via transmission means.

8. The aircraft of claim 7, wherein said engine means is located within said fuselage, said transmission means extending within said booms.

9. The aircraft of claim 8, wherein said transmission means includes a drive shaft within each boom, each drive shaft having a distal end carrying a first conical gear enmeshing with a second conical gear on one end of a propeller shaft, another end of said propeller shaft being coupled to a propeller hub carrying said propeller blades, said hub and blades comprising a said propeller.

10. The aircraft of claim 9, wherein each blade is rotatably connected to said hub via an insert swivelling on a spindle via two spaced bearings.

11. The aircraft of claim 9, wherein each blade is rotatably connected to said hub, and further comprising pitch varying means for simultaneously rotating said blades with respect to said hub to adjust propeller pitch.

12. The aircraft of claim 11, wherein said pitch varying means comprises both a collective pitch varying means and a cyclic pitch varying means.

13. The aircraft of claim 12, wherein pitches of left and right propellers are controlled by a common pitch control assembly which maintains equal pitch for each propeller.

14. The aircraft of claim 12, wherein cyclic pitch variation is controlled by a swash plate.

15. The aircraft of claim 8, wherein each of said propeller nacelles freely pivots with respect to a respective boom at a pivot, each propeller nacelle having coupled thereto a rod which transmits tilt angle of a coupled propeller nacelle to a central assembly for restraining tilt angle variation rate and tilt angle between 0° and 90° tilt.

16. The aircraft of claim 15, wherein each said rod comprises a torsion rod whereby one propeller nacelle may tilt at a tilting angle up to 3° different from a tilting angle transmitted to the central assembly.

17. The aircraft of claim 15, wherein said central assembly includes a limit stop preventing tilt angle from exceeding 90° backward.

18. The aircraft of claim 15, wherein said central assembly comprises a damper allowing slow tilt-angle rate for conversion without causing any appreciable change in control moment transmitted for aircraft pitch control.

19. The aircraft of claim 18, wherein said damper comprises a reciprocating rod coupled to said torsion rod and carrying a piston received within a cylinder, said cylinder having ports to either side of said piston interconnected by a conduit having a calibrated nozzle for restraining tilt-angle variation rate to relatively small values.

20. The aircraft of claim 19, wherein said conduit has a valve therein comprising brake means actuable between an opened position allowing free flow of fluid and a closed position stopping fluid flow and braking piston movement.

21. The aircraft of claim 19, wherein said torsion rod is coupled to said reciprocating rod via a rack and pinion.

22. The aircraft of claim 19, said cylinder having an upper wall comprising a limit stop limiting upper movement of said piston and, thereby, pivoting movement of a propeller nacelle.

23. The aircraft of claim 15, wherein each propeller nacelle pivot has a lock engageable to maintain propeller axis parallel to aircraft axis.

24. The aircraft of claim 1, further including cyclic pitch control means for controlling cyclic pitch of said propeller blades, adjustments of cyclic pitch of said propeller blades with said brake means at least partially released causing automatic relative pivoting movements between said nacelles and booms.

25. The aircraft of claim 14, wherein movements of a control stick are transmitted to said swash plate by flexible ball bearing control drives.

26. In a vertical takeoff and landing aircraft including two opposed propeller carrying nacelles freely pivotably mounted to move between generally horizontal and vertical orientations, the improvement comprising:
  a) each propeller being unshrouded and driven by engine means;

b) pitch varying means for varying propeller pitch;

c) brake means for controllably preventing free pivoting of said nacelles;

d) control means for controlling operation of said aircraft including control of said pitch varying means;

e) said aircraft being flown from a position sitting on a ground surface with said nacelles in a generally vertical orientation and lifting off controlled by a pilot operating said control means, whereby release of said brake means allows (1) forward self-pivoting of said nacelles, responsive to controlled adjustment of said pitch varying means, to a generally horizontal orientation to permit horizontal flight of said aircraft, and (2) backward self-pivoting, responsive to controlled adjustment of said pitch varying means, to return from horizontal flight to hovering and landing.

27. The aircraft of claim 26, wherein each nacelle is connected to said brake means via a torsion rod twistable up to 3° with respect to a pivoting angle of one of said nacelles.

28. The aircraft of claim 26, wherein said brake means includes a piston slidably received within a cylinder, a conduit interconnecting opposed ends of said cylinder and a valve in said conduit, closure of said valve preventing piston movement, said piston being coupled to a nacelle pivot.

29. The aircraft of claim 26, wherein said control means includes a control stick universally mounted in said aircraft and adapted to control propeller pitch.

30. The aircraft of claim 29, wherein movements of said control stick are transmitted to a swash plate by flexible ball bearing control drives.

31. In a vertical takeoff and landing aircraft including opposed left and right nacelles, each carrying an unshrouded propeller having a plurality of blades comprising a left and right propeller, respectively, said nacelles being pivotably mounted to move between generally horizontal and vertical orientations, the improvement comprising said left propeller turning counterclockwise and said right propeller turning clockwise and each propeller including ditch variation means for varying cyclic pitch thereof, said nacelles pivoting on said aircraft, a roll control solely operated by varying lateral cyclic pitch of said propellers regardless of orientation of said nacelles whereby opposed rotation directions of said propellers results in additive direction of roll action of radial forces on said blades.

* * * * *

UNITED STATES PATENT AND TRADEMARK OFFICE
CERTIFICATE OF CORRECTION

PATENT NO. : 5,839,691
DATED : November 24, 1998
INVENTOR(S) : Jean Soulez Larivere It is certified that error appears in the above-indentified patent and that said Letters Patent is hereby corrected as shown below:

At column 6, line 26, change "movements" to --moments--;

At column 10, line 27, delete the equation and substitute the following equation: $\sqrt{1^2 + 0.25^2} = 1.03$ At column 18, line 15, change "ditch" to --pitch--;

In the drawings, sheets consisting of Figures 18, 19, and 20 should be deleted to appear as per attached sheets.

Signed and Sealed this

Twenty-eighth Day of September, 1999

Q. TODD DICKINSON

Attest:

Attesting Officer

Acting Commissioner of Patents and Trademarks